United States Patent [19]

Maus et al.

[11] Patent Number: 4,828,769
[45] Date of Patent: May 9, 1989

[54] METHOD FOR INJECTION MOLDING ARTICLES

[75] Inventors: Steven M. Maus, Osseo; George J. Galic, Columbia Heights, both of Minn.

[73] Assignee: Galic/Maus Ventures, Columbia Heights, Minn.

[21] Appl. No.: 860,006

[22] Filed: May 5, 1986

[51] Int. Cl.$^4$ .................. B29D 11/00; B29D 17/00; B29C 45/80

[52] U.S. Cl. .................. 264/1.3; 264/2.2; 264/107; 264/297.2; 264/328.7; 264/328.8; 425/808

[58] Field of Search .......... 264/2.2, 107, 1.3, 297.2, 264/328.7, 328.8; 425/808

[56] References Cited

U.S. PATENT DOCUMENTS

| | | | |
|---|---|---|---|
| 2,373,201 | 4/1945 | Smith | 425/808 |
| 4,254,065 | 3/1981 | Ratkowski | 425/808 |
| 4,540,534 | 9/1985 | Grendol | 264/2.2 |
| 4,627,809 | 12/1986 | Okabayashi et al. | 425/555 |
| 4,707,321 | 11/1987 | Segawa et al. | 264/294 |

FOREIGN PATENT DOCUMENTS

| | | | |
|---|---|---|---|
| 0130769 | 1/1985 | European Pat. Off. | |
| 148055 | 11/1979 | Japan | 264/2.2 |
| 6054 | 2/1980 | Japan | 264/2.2 |
| 371078 | 4/1973 | U.S.S.R. | |

Primary Examiner—James Lowe
Attorney, Agent, or Firm—Merchant, Gould, Smith, Edell, Welter & Schmidt

[57] ABSTRACT

Method and apparatus for injection compression molding of thermoplastic parts. A preferred apparatus (100) includes a platen assembly 106, a toggle clamp assembly 102, a screw injection assembly 101, a hydraulic system suitable for providing power to the toggle clamp assembly 102 and the screw injection assembly 101, and a control system 88 for operatively controlling the various hydraulic devices associated with the molding apparatus. The platen assembly 106 provides for a plurality of variable-volume mold cavities 7. In one embodiment, enlarged mold cavities 7 receive plasticized resin from the screw injection assembly 101, and compression of the injected resin is provided by the toggle clamp assembly 102. In another embodiment, the platen assembly 106 includes a floating die assembly wherein pressure created by injected resin causes die inserts 5 and support pillars 15 to slide relative to a molding plate 74. Compression in this embodiment is also preferably provided by the main toggle clamp assembly 102. Preferably, the toggle clamp assembly 102 provides multiple-stage compression of the resin to first redistribute the resin and vent the cavities and, second, compress the resin to compensate for cooling-induced shrinkage thereof. In the multiple cavity embodiment, because all cavities 7 are equally compressed simultaneously, control of the molding process and balancing of the mold are readily accomplished. The method and apparatus are particularly well suited for molding optical lenses and disks. Printed circuit substrates can also be molded thereby.

31 Claims, 12 Drawing Sheets

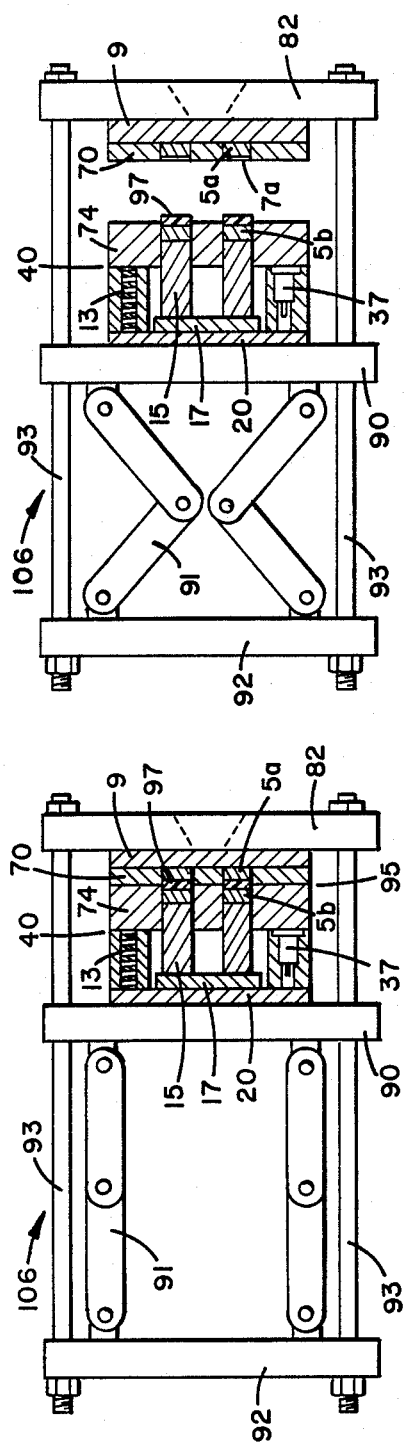
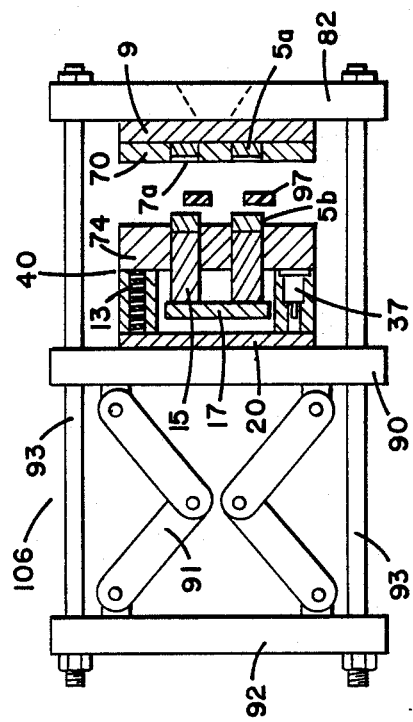
FIG. 6
FIG. 7
FIG. 8

METHOD FOR INJECTION MOLDING ARTICLES

FIELD OF THE INVENTION

The present invention relates generally to thermoplastic molding apparatus and methods, and more particularly pertains to methods and apparatus for injection/compression molding thermoplastic optical lenses and disks.

BACKGROUND OF THE INVENTION

While the present invention could be used to mold a wide variety of things, it is applied most advantageously to precision molding thermoplastic articles such as lenses and optical disks. Thus, the invention will be described in terms of lenses and disks, but those skilled in the art will recognize that it is not so limited.

A. Lens Molding

Lenses are used for a wide variety of purposes. For example, microscopes and other optical instruments, as well as ophthalmic spectacles, employ lenses. Though the present invention involves processes and devices for producing lenses in general, the following discussion will focus on ophthalmic lenses by way of example.

Vision-corrective, prescription (Rx) spectacle lenses or ophthalmic lenses increasingly employ plastic lens materials instead of the more traditional glass. In fact, in the United States, the demand for plastic lenses is roughly twice that for glass lenses. This major shift, occurring mostly in the last ten years, is because:

1. plastic is lighter than glass;
2. protective scratch and abrasion-resistant resistant coatings have become available for plastic;
3. plastic comes in a wider range of fashionable colors and gradient-density tints; and
4. production techniques have been improved so that plastic lenses can be manufactured at higher rates and in a more automated fashion.

Of these factors, the relatively lighter weight and corresponding improved wearer comfort of plastic lenses are most important. Since nominal lens thickness (typically 2.0–2.2 mm) is the same for glass and plastic, plastic lenses' lighter weight relates directly to plastic's reduced density as compared to glass. This factor holds true for all equivalent prescriptions in glass and plastics, but becomes particularly important when higher-powered corrections are required or when larger, more fashionable spectacle frames are chosen, requiring larger lens diameters.

Of all plastic Rx lenses, much greater than 90% are currently manufactured b individually casting and thermoset-peroxide curing allylic resins. However, since their commercial introduction in 1980, polycarbonate thermoplastic Rx lenses have shown great potential for replacing both cast-thermoset plastic and traditional glass lenses: because of even lower density and higher refractive index, polycarbonate lenses of the same nominal thickness feature even lighter weight than the cast-allylic plastics, and far lower than glass. Additionally, since polycarbonate has far greater impact strength and breakage resistance than any other clear polymeric material, even thinner lenses (in the range of 1.5–2.0 mm) are potentially available, with even higher wearer preference.

Until recently, however, polycarbonate's potential advantages over cast allylics were virtually offset by comparatively poorer hardcoatings performance and poorer tintability, as well as restricted product line ranges and high manufacturing costs associated with low-volume production. In the last two years, readily tintable coatings possessing good abrasion resistance have become commercially available for polycarbonate lenses. Therefore, polycarbonate's remaining drawbacks appear to be associated with availability, breadth of product line, manufacturing costs, and order turnaround.

The advantages and disadvantages associated with the use of polycarbonate are particularly pertinent and applicable to finished single-vision lenses, which are supplied with both final-front-convex and back-concave optically finished surfaces, and with a factory-applied tintable hardcoating on both surfaces. To convert such finished single-vision lenses (which constitute nearly half of all U.S. prescriptions filled) requires merely edging the excess lens away to fit the frame, and optionally, tinting the lens to desired color with conventional dye baths.

As mentioned above, the current state-of-art in polycarbonate finished single-vision lens manufacturing has certain drawbacks which prevent lowest manufacturing costs and improved availability. A finished single-vision lens is optically defined by two measures of its light-bending power: spherical power (magnification) and cylindrical power (astigmatism correction), with units of power being read in diopters and $\frac{1}{4}$ units thereof. A product availability matrix which provides for sphere power ranging from +4 to −6 diopters and cylinder power from 0 to +2 diopters, constituting 273 stock-keeping units, is desired. Within this matrix, there is a unit-volume frequency distribution curve which has at its approximate center a zero-power lens and which generally shows reduced frequency as sphere or cylinder power increases. In order to satisfy most incoming prescriptions on a statistical basis, a large matrix of stockkeeping units must be maintained and inventoried for quick order turnaround if a particular manufacturer or lens type is to become popularly accepted in the market.

In addition to maintaining this wide range of product line, the lens manufacturer must necessarily produce high volumes of such thermoplastic-molded, hard-coated lenses. In order to successfully ammortize the high capital costs of highly automated capital-intensive equipment and the mold-tooling inventory, to thus reach a unit cost per lens that is competitive with cast-allylic-type lens production, literally multi-million pairs per year production must be produced.

Those skilled in the art of injection molding recognize the desirability, therefore, of a molding process which permits Rx lens molding at high yields, minimal materials scrap or secondary operations of trimming, and high levels of automation. Additionally, given the number of stockkeeping units, each of which has a different statistical frequency distribution, it is especially desirable to be able to run, within the same multi-cavity moldset, differing lenses of differing powers (within some reasonable range) at the same time and with the same setup, without sacrificing productivity, quality or yields. A four-cavity moldset, for example, quadruples the productivity associated with a particular molding machine without proportionately increasing its capital cost (i.e., usually less than 50% higher). Continuing this example, two of the cavities could be used to mold the most popular sphere and cylinder power combination and the remaining cavities could each handle a less popular lens, with more frequent changeovers of the latter.

The prescription lens background having been described, attention is now directed to disk molding processes and apparatus. While much of the foregoing discussion is relevant to disk molding, the application of the present invention to optical disk manufacturing will be better appreciated in light of the following.

B. Optical Disk Molding

Attention is now directed to optical disk molding. Improved molding methods and apparatus for higher productivity and quality at potentially much lower cost are desired for molding laser-read information storage optical disk substrates from suitable clear thermoplastic polymers. Optical disks include video disks (employing analog signals), audio compact digital disks, as well as a wide variety of computer program information and data storage disks like CD/ROM (irreversibly encoded with program information at the factory; thus, Read-Only Memory), DRAW ("user-write-once"), and EDRAW (user-erasible).

1. Disk Product Requirements

Many of the various disk types just listed are encoded during the molding process, by means of a removable "stamper" as one mold-face surface in the mold cavity. In such a process, the digital information pattern is represented on the stamper by a spiral of tiny projections which in turn form in the plastic molded disk a spiral of indentations 0.1 micron deep and .1-3.3 microns long, with track pitch of 1.6 microns in a spiral array growing radially outward.

Therefore, one requirement for good-quality molding would be to assure the most intimate contact of the polymer melt with the stamper surface, without any voids, bubbles, or premature shrinkage away from the patterned contour, from the time the cavity is fully filled with melt until that melt is cooled to below its glass-transition temperature.

Another requirement inherent to all optical disks, regardless of whether they are information-encoded by in-mold stampers or not, is the necessity to minimize orientation or internal stresses within the thermoplastic polymer (ideally, a perfectly isotropic molding would result), since molded-in stresses and flow-induced orientation both produce localized differences in the light-bending power of the plastic. These spot-to-spot nonuniformities of refractive index can be measured in terms of optical path differences, and are most commonly expressed as "birefringence". Minimum birefringence in the information-encoded portions of the disk is a specification requirement of all the various disks.

Since all employ laser-signal reading, any characteristic or flaw of the optical plastic disk which either disrupts or deflects the laser beam is a problem. Such plastic properties as percent light transmission, percent haze, and yellowness index all become relevant, along with localized flaws including, most objectionably, opaqu black specks or clear particles (voids, bubbles, or clear specks, all of which have different refractive index and optical-bending power than the adjacent polymer matrix). Also, absolute planarity or flatness of the disk is desired, since localized warpage would induce prismatic effects on the laser beam and result in off-axis signal transmissions.

2. Cost Considerations

A further requirement of optical disk molding processes is of course to produce the highest possible quantities of such disks at the lowest possible costs and capital investments, while maintaining the quality criteria mentioned above. Annual capacities of millions of disks per year are absolutely necessary for any economically viable manufacturer due to the extremely high fixed cost associated with conducting virtually all production operations in class 1,000-class 10 clean room particle-free air environments. In such white-room environments, humans are the biggest source of airborne particles, so therefore automation of part-handling and post-molding operations is maximized, further adding to the fixed-cost structure of the business.

Furthermore, since microprocessor-control or CNC (computer numerical control) process controls are almost universally used on optical disk injection-molding machines, a large percentage of the molding machine capital investment is in controls. Each molding machine must have its own moldset, its own mold temperature controller/heater and usually its own hopper dryer. Each must also have its own clean-air shower for its clamp-open and part-removal area, its own robotic part pickers and disk spindles, and controls thereof.

Still, all known optical disk molding processes employ simple, one-cavity molding (one molded disk per molding machine cycle). Obviously, such one-cavity production can make highly inefficient use of expensive clean room floor space, as well as very high capital and equipment fixed costs per disk.

DESCRIPTION OF THE PRIOR ART

A. Injection Molding (without any Compression)

1. Lenses

The very earliest attempts to make acrylic or polycarbonate thermoplastic, injection-molded Rx lenses typically involved the use of a mold cavity having fixed surfaces throughout the molding cycle. Such molding processes employ very long molding cycles, quite high mold-surface temperatures (sometimes approaching the thermoplastic's glass-transition temperature), along with higher than average plastication and melt temperatures for that given resin, and slow, controlled fill rates followed by very high packing pressures, which are held until gate freeze-off is complete.

Fixed cavity processses of the type described above employ larger than normal gating and runner systems to permit maximum packing pressure and delivered material before gate freeze-off occurs, at which time no further transfer of molten polymer occurs between the runner system or plasticating unit and the cavity. Gate freeze-off in a fixed cavity injection machine presents a problem: given that powered lenses have differing front and back radii of curvature (which thereby create the light-bending power characteristic of that focal-length lens), prescription lenses must therefore have differing cross-sectional thicknesses, which in turn leads to non-uniform shrinkage during part formation in the mold cavity and cooling-down. The thickest sections of the lens are subject to slight sink marks or depressions which in turn cause a break in the otherwise uniform radius of curvature of the lens surface. This break results in a localized aberration, or deviation in the light-bending character of the lens at that area of sink.

Thus, although great care is taken to see that the injected polymer mass conforms perfectly to the fixed lens mold cavity surface, contour, and dimensions, once gate freeze-off prevents additional packing pressure and material transfer (which may actually take place in the thinnest cross-sectional area of the lens itself), differential shrinkage begins to occur within the polymer melt, and the polymer skin begins to pull away from the mold surfaces accordingly (worst in the thickest cross-sections). This pre-release (partial or complete release of the molded plastic lens before the mold cavity is unlocked and opened for part removal) detrimentally affects optical quality, since the molded lens contour and surface no longer can be forced by intimate contact to exactly replicate the precision optical mold surfaces and curve contours.

2. Disks

This portion of the Description of the Prior Art deals with straight injection molding of optical disks. Optical storage disks have high aspect ratios (relatively large diameters compared to relatively small thicknesses). This presents molding problems due to the very high length of flow required and the very small cross-sectional orifice of the mold cavity. For example, in the standard compact disk format for the computer storage disks and audio digital disks, the radial-flow distance from sprue center line to the edge is 60 mm, yet the thickness is only 1.2 mm, for an aspect ratio of 50:1. And, video disks' flow-path radius radii are nearly twice as large as that for a computer disk. FIG. 19 is a crosssectional view showing in 2× scale a compact disk and its flowpath.

The two most popular thermoplastic polymers employed in optical disks are acrylic (polymethyl methacrylate or PMMA) and polycarbonate. The former features inherently better flow properties at lower melt temperatures and far lower birefringence or polymer orientation problems; however, its relatively high water absorption (which results in swelling and warpage distortions) and relatively low creep resistance and heat distortion temperatures make it less desirable for anything but video disks wherein these disadvantages are largely overcome by means of a sandwich (two disks cemented together with information encased therein) construction.

While polycarbonate is the polymer of choice from the disk performance standpoint, it has very serious processing limitations which, until about 1982 or 1983 essentially precluded its serious use for the production of disks other than by injection compression means. Ordinary optical grades of polycarbonate then available were at the 6–15 melt-flow index range (mfi, as defined by ASTM-D-1238). Only with the relatively recent development of very high melt-flow (55–60 mfi) grades of optical polycarbonate has straight injection been at all practical.

Even with high-flow polycarbonate, straight injection of polycarbonate causes inherently higher birefringence than injection/compression molding processes.

The greatest problem inherent to straight injection is that the mold cavity is defined by fixed dimensions which do not change during the molding cycle and which are only slightly larger than that of the finished part (by a shrinkage-compensation factor of approximately 0.5 percent). Polycarbonate is an amorphous polymer, and its chains form random coils and "fuzzball" configurations when in their preferred, relaxed state. When polycarbonate melt is pushed through restrictive flow-paths and orifices (i.e., gates and high-aspect-ratio mold cavities) by very high injection pressures these fuzz-balls distort from the stretching and shearing forces, causing forcible alignment of the polymer chains parallel to each other, which in turn creates severe anisotropy. The well-known bubble theory (e.g., see "Bubble Theory of Mold Filling" by John R. Byrne, Society of Plastic Engineers, Inc., 41st Annual Technical Conference Technical Papers Reprint, Vol. XXIX, 1983, pp. 702-4) of mold-cavity filling predicts that the incoming melt front is a dynamically stretching membrane of molten polymer analogous to a balloon or bubble. Behind the melt front, more polymer is flowing in, keeping the advancing melt front "inflated", to follow the bubble analogy. In this zone, orientation is caused by shearing of one polymer layer over another, which is an inevitable consequence of the unavoidable velocity differences resulting from the center line flowing faster than the edges. Depending upon the degree of constraint and the injection velocity setup, a velocity profile is formed wherein the lowest velocities are at the mold surfaces and the highest velocity is found at the centerline. See FIG. 20 of this application, showing three different melt velocity profiles "A", "B" and "C" into the same restrictive cavity. Profile "C" shows a slowly moving melt front and lower pressure fill; its "bubble stretching" skin is less distorted, has a flatter radius of curvature and is less stressed. Profile "A", by contrast, shows a rapidly advancing meltfront at higher pressure, with a steper curvature to its meltfront skin and with correspondingly greater shearing between internal layers. Profile "B" shows an intermediate profile between "A" and "C".

In direct proportion to the severity or magnitude of these velocity differences existing at the melt front is the corresponding severity of orientation, with greatest orientation at the surface and next greatest at the subsurface layers, with center-line core orientation being nonexistent.

This bubble theory explains the inherent problems of straight injection molding of polycarbonate optical disks, which inevitably must employ very high fill rates (nearly always with an accumulator assist and no velocity-fill profiling variations), in an attempt to inject at the highest possible speeds the hottest, most fluid, polycarbonate polymer melt into this narrowly constrictive fixed-cavity configuration.

Elaborate plastication means for providing the hottest possible melt without catastrophic degradation is also common in straight injection disk molding methodology; hotter melt being less viscous provides less internal shearing forces and also freezes more slowly, thus allowing more time for melt relaxation (orientation decay) after flow ceases and before the disk solidifies. Such plastication techniques often incorporate starved feeding or minimally-sized barrel/screw combinations, in order to minimize the residence time of the polycarbonate polymer in the injection plastication unit, since quite high melt temperatures are inherently required to perform this method. Some plastication units feature very high deliberate shearing of the melt; as would be expected, they suffer more polymer degradation side effects including carbonized specks ("black specks" which are read-out flaws in the disk).

The inherent tradeoff between degradation-type flaws (from an abusively-hot plastication melt) and high orientation effects (from an extraordinarily fast fill rate into a high-aspect-ratio restrictive mold cavity) creates a narrow "process window" (permissible process latitude while still producing good quality product) which in turn has made straight injection practical and conceivable only in a one-cavity (one disk per molding cycle) molding process. Since so very little room for error exists with even the one-cavity process, multiple cavities (desirably four or eight cavities in the mold) are extremely unlikely due to the typical cavity-imbalance problems of any multi-cavity process.

An additional difficulty with straight injection is that the mold cavity contents gradually shrink as they are cooled, causing the solidifying disk to pull away from the mold surfaces. Premature release of this kind can permit differential warpage or imprecise replication of the signal-encoded surface contour patterns of the stamper, again creating quality problems. Therefore, inherent to straight injection is extremely high injection pack pressures to attempt to maintain maximum cavity pressure until gate freeze-off has occurred. However, this application of pressure also causes a re-extrusion or cold-flow phenomenon of the increasingly-viscous polymer core within the fixed dimensions of the mold cavity. Such forcible redistribution of the partially-solidifying melt creates internal stresses which in turn add to the unacceptable birefringence.

Due to these inherent limitations, the prognosis for high-yield multiple cavity molding (particularly for more than just two cavities) with straight injection is very poor and, correspondingly, its production economics and capacity utilization do not optimize fixed costs, as discussed earlier.

B. Injection/Compression Molding

To overcome the problems mentioned above, molding techniques which employ some compression of mold cavity contents after injection fill are desirable. These injection/compression techniques can generally be divided into two types:

Clamp-end injection/compression: Compression induced by movable platen motion, or molding machine clamp-end compression.

Auxillary component injection/compression: Full molding machine clamp-up (no movable platen motion), with mold-cavity compression induced by auxiliary moving components internal to the moldset (usually driven by their own springs or auxillary hydraulic cylinders).

Each of these injection/compression techniques is discussed below.

1. Clamp-End Injection/Compression or "Coining"

First disclosed by Martin (U.S. Pat. No. 2,938,232, issued May 31, 1960) but popularized by Engel's "sandwich press" toggle-clamp injection-molding techniques (see, for example, Engel brochure A-24-TV-4/75, Ludwig Engel, Canada Ltd., Guelph, Ontario, Canada), this approach in each case generally involves the following process sequence:

a. From their full-open position, the mold platens and mold halves (and opposing male and female cavities formed thereby) are brought together until a predetermined air gap is present at the parting line.

b. At that point, a very low pressure, low-velocity injection fill begins (to prevent molten plastic from splashing through the air gap).

c. After injection fill is completed and the molten polymer mass is allowed to cool for a predetermined time interval, the injection molding machine commences a closing motion of the movable platen. This clamping-up motion mechanically seals off the mold cavity and its partially solidified contents to zero-clearance at the parting line, thus locking up the mold halves for the duration of the molding cycle at some predetermined clamp pressure.

d. Under this clamp pressure, the partially solidified polymer mass is compressed due to the reduced separation of the male and female dies' precise mold surfaces being brought nearer together by the air-gap distance existing at the parting line when initial injection started. By eliminating this air gap, the volume of the cavity-and-runner system is proportionately reduced, resulting in compressive forces being exerted upon the partially-solidified polymer contents, causing a re-orientation and re-flow phenomenon.

e. Held under this clamp-induced compressive force, the mold cavity's contents continue cooling and solidifying, eventually reaching a temperature sufficiently below the glass-transition temperature of that polymer (in the case of polycarbonate, $T_g = 296$ degrees F.) that the molded article may be safely ejected without risking optical distortion. Then the whole cycle starts again, as the movable platen is moved to the predetermined air-gap position to await injection of the next shot.

While clamp-induced coining offers considerable advantages over straight injection, the current state-of-arts in such clamp-induced coining gives optimum results only within a narrow band of process parameters or setup conditions. Such successful coining is a function of:

a. Initial injection pressure and fill rate;
b. Air-gap dimension;
c. Timing interval between injection and compression; and
d. Final clamping forces.

Especially critical is control of injection pressure and fill rate, along with the timing interval. In order to prevent molten polymer from spilling outside the desired runner-mold-cavity configurations, the injected melt must be allowed to form a surface skin and partially solidify. Otherwise, molten polymer spills or "flashes" into the air-gap, necessitating costly and laborious trimming operations on the molded part. Even worse, if the melt has solidified to too great an extent, compression at ultimate clamping pressures can cause hobbing or deformation of the mating plates at the parting line, thus damaging the moldset. Cooling time interval is additionally critical to achieving acceptable molded part yields, since if the melt is not sufficiently solidified at its most constrictive point (i.e., gate freeze-off has not been completed), then partially molten polymer can still be extruded under this compressive force back out of the cavity and into the runner system, which can then result in an underfilled and underpacked part with badly distorted surfaces. On the other hand, if compression is delayed too long, too much polymer solidification will have occurred when the compressive force through final clamp-up is initiated, resulting in forceable reorientation of the polymer and "cold working" of the plastic, which in turn produces birefringence and undesirable molded-in stress levels, with resulting localized nonuniform light-bending characteristics.

Illustrative of these problems in the context of optical disk molding is Bartholdsten et al (U.S. Pat. No. 4,409,169), which teaches the need for a slow (up to 3 seconds), low-pressure injection of an oversized shot into a partially-open (air gap) mold parting line, then providing for deliberate melt cooling and viscosity-thickening, followed by a short pressing stroke (typically 1/5 to 1/10 the disk's thickness, or 0.005–0.010 inch) which initially squeezes out of the reduced mold cavity volume the partially-cooled and viscous excess plastic, then as the pressing continues to the fully-closed parting line position (zero clearance), this radially-extruded overflow is pinched off and full clamping force is thereafter maintained for shrinkage compensation and to assure no prerelease.

Another clamp-induced disk coining process is disclosed in Matsuda et al (U.S. Pat. Nos. 4,442,061 and 4,519,763) wherein, into a slightly opened moldset, a melt is injected and cooled till fully solidified, then reheated till uniformly above the plastic's melt temperature, at which point clamp-actuated compressive stroke is conventionally delivered and maintained through this second cooling cycle. The energy efficiency and total cycle time of such a process are highly questionable.

2. Auxillary Component Injection/Compression

As noted above, another type of molding process (termed an "auxillary component" process for the sake of discussion) includes the use of auxillary springs, cylinders or the like which function to apply a compressive force to the opposing optical surfaces and which are commonly internal to the mold itself or as peripheral apparatus thereto. The primary difference between "auxillary component" molding and clamp-end injection/compression, therefore is that mold compression is provided by a stroke-producing element inherent to known modern injection molding machines (examples of same are the ejector or movable platen driving mechanisms such as the main clamp) in the latter whereas mold compression is provided by auxiliary springs or hydraulic cylinders, for example, in the former. Furthermore, clamp-end injection/compression motions are inherently sequenced through and coordinated by the molding machines process control system, whereas auxillary component compression is controlled (if not self-action, like springs) separately by timers, etc., not supplied with the standard machine.

A further differentiation is that auxillary component compression does not employ motions of the movable platen to provide compressive forces to reduce variable volume cavity(s), and instead employs a fully clamped-up mold with no relative motion of the A and B mold clamp plates or no relative motion of fixed and movable platens during the injection fill and the cavity-volume-reducing compression and cooling portions of the molding cycle.

The above conditions are true of prior art examples of auxillary component injection compression molding discussed below.

Early thermoplastic lens molding of this type employed simple spring-loaded, movable optical dies within the moldset (Johnson, U.S. Pat. No. 2,443,286, issued June 22, 1948). Such apparatus created a variable-volume lens mold cavity thereby, but relied upon high internal polymer melt pressure to spread the movable dies against the resisting spring pressure. In order to apply sufficiently great compressive forces upon the solidifying mold contents, these spring forces were great. However, the greater the spring force, the greater the injection pressure that must be used to compress the springs during variable cavity fill. The greater the injection pressure required, the greater the degree of molded-in stresses and optically unsatisfactory birefringence. Of course, the greater the optical power for the molded lens, the greater the dissimilarity between the front and back curves and thus the greater the cross-sectional thickness variation. Also, the larger the lens diameter or the thinner the nominal lens thickness, the worse the center-to-edge thickness variations and the higher the degree of difficulty in preventing differential thermal shrinkage and resulting optical distortion to the finished lens. Therefore, processes of this type are generally limited in practice to production only of weakly powered lenses with minimal diameter and minimal thickness variations.

A subsequent "auxillary component" process is represented by Weber (U.S. Pat. Nos. 4,008,031 and 4,091,057), which also uses a variable-volume lens mold cavity. Weber teaches a variable-volume cavity formed by injection-melt, pressure-induced rearward deflection (in one embodiment) of at least one movable male or female die, which after a certain interval is followed by forward displacement resulting in compression under the driving force of an auxillary hydraulic cylinder mounted in one-to-one relationship with this movable die. Flow ports are provided through which excess increasingly-viscous, partially-cooled injected polymer melt is forcibly extruded from the lens cavity under the compressive forces.

In operation, Weber teaches very slow mold fill (approximately 10 seconds). Also, like conventional clamp-induced coining, Weber relies upon a preset amount of time to elapse between completion of injection fill and commencing compressive pressure. Accordingly, the same problems related to either premature compression (inadequate solidification) or excessively delayed compression (late solidification) result.

An additional problem with Weber is that his process can also produce inconsistent and varying nominal-thickness lens. Depending upon the timing interval of the particular setup, the travel of the movable die is controlled by the length of time elapsing after molten plastic enters the variable cavity and pressure is applied to the movable die. Also, the final volume of the cavity is controlled by the length of time that pressure is applied to the movable die. Not only would this likely result in product variation within the same production run, but there may be considerable lens thickness variation of the same prescription-power lens produced at different dates with different production runs and correspondingly different production setups. This excessive thickness variation over the course of a year's production is of course unacceptable.

And, although Weber shows a two-cavity mold layout in his drawings, each cavity's compression is controlled by separate and independent hydraulic cylinder assemblies. That is, the two cavities are not simultaneously acted upon by a common component. Given the large number of parameters which can affect individual cylinder performance, it is unlikely that exactly the same cylinder response times and forces can be delivered smoothly and uniformly in a multi-cavity array. The larger the number of cavities thus employed, the larger would be the expected variation even if all cavities are supposedly running exactly the same powered lens with supposedly identical set-up conditions, even within the same production-run campaign, much less over a six month period. To run multi-cavity simultaneous molding of differing lens powers becomes extremely difficult using the Weber process.

Still another "auxillary component" process is represented by Laliberte (U.S. Pat. No. 4,364,878). Laliberte includes a movable die coupled to an auxillary hydraulic cylinder. After the mold is closed under clamp pressure, the mating die parts are spread apart. A precise volumetrically-metered shot size of predetermined quantity just adequate to fill the fully-compressed mold-cavity-and-runner system is then injected. This control of shot size allows compression free of partly-solidified melt displacement out of the mold cavity through an overflow port (as taught by Weber), permitting therefore greater control of nominal lens thickness and so eliminating material scrap waste and trimming operations (as required with Weber, for example).

However, Laliberte appears limited solely to one-cavity lens production by virtue of its reliance upon a precisely-metered melt accumulator which corresponds one-to-one with the injected melt in the cavity-and-runner, and by virtue of its reliance upon an individually-controlled and sequenceable hydraulic cylinder in one-to-one motion relationship to the variable-volume lens cavity. Practical considerations militate against a multiple cavity process with multiples of such melt-accumulator and compression-cylinder components, all of which would have variations one to the other, which would thus induce within the fill and in the compression (critical phases of the lens part formation) a cavity-to-cavity variation, even when attempting to mold exactly identical lenses. As in the case of Weber, a multiple cavity Laliberte machine would be impractical because the individual cavities would not be acted upon by a common component to thereby simultaneously compress the resin contained therein.

Additionally, Laliberte's auxillary cylinder is limited in terms of the compressive force which can be exerted. In comparison to Weber's 20-ton compressive forces, Laliberte teaches compressive pressures ranging from 100–800 pounds per square inch. Such auxiliary cylinders are of course limited in the total force that can be reasonably applied and, furthermore, over their working life of cycle after cycle, 24 hours per day, month in and month out, encounter gradual loss in capacity as well as response, even if maintained and serviced. Laliberte discloses lens-thickness control but only with regard to nominal 3.0 mm thickness, which is 50 percent again greater than the desired consumer-lens thickness available with cast-allylic lenses today. As thickness is reduced from 3 mm to 2 mm (or, preferably, less than that), increasingly greater compressive force is required. Providing such a compressive force with individual auxillary cylinders operating in a multi-cavity mold layout would certainly be disadvantageous both in terms of cavity-to-cavity uniformity as well as in the total compressive forces available day in and day out when compared to a clamp-initiated compressing process (which makes available a total clamping force of hundreds of tons, capable of being applied uniformly to all cavities simultaneously).

Furthermore, it is perceived that Laliberte could not be applied to simultaneously produce, at reasonable yields, dissimilarly-powered, desirably-thin lenses within the same multi-cavity mold.

While "auxillary component" processes have to some degree been useful in molding powered ophthalmic lenses and are herein discussed, generally these approaches have not been applied to optical disk molding, probably at least for the following reasons:

a. The technical problems are somewhat different. Rx lenses must deal with the inherent differential-shrinkage caused by very thick and thin cross-sections within the same len.. Also, minus-powered lenses (having relatively flat front convex curve and relatively steeper back concave curve) must avoid melt knitlines or weldlines associated with edge gating. Rx lenses have, compared to disks, much lower aspect ratios (about 35:1) and lower "projected area" to clamp up (7 square inches for a typical lens vs 17.7 square inches for a typical optical disk). Also, an optical disk is formed between virtually identical planar mold cavity surfaces.

b. Compressive forces for such in-mold "auxillary component" approaches are much less than are available through clamp-actuated coining, and this limitation is particularly troublesome for disks because of their projected area and the necessity for intimate contact between the melt and the stamper.

mechanical "gate freeze-off" (or else either risk premature compression—leading to reextruding partly-cooled viscous melt back out other unfrozen gate or sprue—or too delayed compression—leading to cold-forming and internal shearing forces which create birefringence). Such valving apparatus are tricky and complex at best, even with a one-cavity mold, much less with multi-cavity molds (any variation causes cavity-to-cavity imbalances).

d. Economically-desirable multiple-cavity molding is much more difficult when using a plurality of individual compressing cylinders, each with slightly varying characteristics and capacities even when new, growing worse with aging. Also, any control of position or velocity or multistage application of the compressive stroke of multiple hydraulic cylinders would be crude and comparatively imprecise.

The present invention addresses the shortcomings of the prior art molding processes and apparatus.

SUMMARY OF THE INVENTION

The invention includes novel thermoplastic injection/compression molding appartus and method which have been found especially well suited to produce, for example, optical lenses and optical data storage disks at high output rates and yields yet minimal costs. Broadly stated, one method according to the invention includes forming an article from a plasticized thermoplastic resin using an injection molding machine capable of producing a main clamp force, comprising:

(a) forming a closed mold cavity suitable for receiving the plasticized resin without introducing significant back pressure therein;

(b) injecting into the closed mold cavity a mass of the plasticized resin slightly larger than the mass of the article to be formed;

(c) applying the main clamp force of the injection molding machine so as to reduce the volume of the closed mold cavity, thereby redistributing the resin contained therein; and (d) maintaining the applied main clamp force thereby compressing the resin at least until the resin within th closed mold cavity solidifies.

Another method according to the invention broadly includes forming a plurality of articles from a plasticized thermoplastic resin using an injection molding machine having first and second mold platens, first and second parting line mold plates, a plurality of first mold inserts operatively disposed within the first parting line mold plate, and a plurality of second mold inserts operatively disposed within the second parting line mold plate, wherein the first and second mold plates and first and second mold inserts are respectively commonly supported by the first and second mold platens, the method comprising:

(a) forming a plurality of closed mold cavities with the parting line mold plates and associated pairs of the mold inserts by urging the parting line mold plates together to eliminate any parting line air gap therebetween;

(b) injecting into each closed mold cavity a suitable mass of the plasticized resin;

(c) commonly and simultaneously applying a force to the mold inserts in a predetermined fashion to reduce the volumes of the closed mold cavities and redistribute the resin contained therein; and (d) maintaining the applied force thereby compressing the resin at least until the resin within the closed mold cavities solidifies.

The invention also broadly includes apparatus for fulfilling the steps given above.

Preferred embodiments of the invention can include the steps outlined below. It must be emphasized, however, that the claims, not the following description, are indicative of the breadth and scope of the invention. For example, while the following description recites a multiple-cavity process, the invention is not so limited.

1. Plastication

A homogeneously-plasticized thermoplastic polymer, such as polycarbonate, is prepared in a reciprocating-screw injection molding machine equipped preferably with computer-numerical-controlled (CNC) solid state process controls. The reciprocating screw delivers a precisely-metered volume of the melt, either:

a. preferably, slightly greater than or;

b. optionally, just equal to that combined volume needed to form lens(es), for example, connecting runner system in fluid communication thereto and to its nozzle source.

2. "Soft" Clamp-up

By means of the molding machine's movable platen, clamping motions bring together the (multi-cavity preferred) moldset into a position whereby the parting line is closed (A and B plates are in contact and no air gap exists) and maintained under sufficient force to withstand melt pressures exerted in the runner system.

3. Variable-Volume-Cavity Created by Two Alternative Means

By means of certain "resilient" members internal to the multi-plate moldset half, which is preferably mounted on the movable platen, a variable-volume mold cavity is established. After injection fill, the volume of this cavity equals or, preferably, exceeds the volume of the injected mass and is greater than the volume of the resulting finished article upon completion of its cooling, shrinkage, and subsequent demolding. The variable cavity can alternatively be produced either by:

a. pre-setting the stroke distance before injection, establishing a predetermined distance between the first "soft-close" position of the movable platen and the ultimate position of the movable platen when the mold is at its maximum "full-clamp-up" position (this distance between the two positions can be called the pressing stroke "cavity pre-fill stroke length"); or by b. allowing the die insert retainer plate to "float" on the resilient member(s) with a very minimal deflection force being necessary for displacement backwards as the cavity is enlarged under the injected melt pressure. The cavity expands until no more melt enters the cavity, and the melt's force becomes too small to further displace the die insert.

A preferred method combines the variable volume cavity technique 3.a. with the slight excess fill injection 1.a.

4. Quick Fill at Low Injection Pressures

Injection of the resin occurs at relatively high fill rates (compared to prior art air-gap coining processes) yet, by means of the variable-volume-cavity concept, at minimum injection pressures measured at the cavities' entry points (this minimizing resulting molded-in stresses and internal stra.ins in the molded part).

5. Melt Compression (Multi-Stage Profiling Optional)

The compression portion of the molding cycle is initiated off of sensors (preferably, screw position) even before the screw has actually completed its travel and before subsequent full delivery of the pre-determined injection volume (either 1.a. or 1.b.) shot size is completed (this early transfer compensates for the inherent inertia in commencing actual compression travel of the movable platen). This melt compression is driven by further motion of the movable platen (other CNC-controlled machine elements such as the ejector plate could optionally be employed). Changes in position and velocity are strictly prescribed by means of numerically controlled clamp end profiling via a CNC process controller. Such compression could simply be one stage (wherein increasing melt back pressure inherently slows the compression stroke progressively) but most preferably is multi-stage in nature, with at least one relatively faster phase and one relatively slower phase. The faster phase displaces any void volume or gas in the over-sized cavity and quickly commences compressive redistribution of the relatively hot, minimally solidified thermoplastic mold cavity contents into its preferred isotropic orientation and assures its intimate contact with the precisely polished mold optical die inserts' surfaces, to produce the desired molded part configuration. The last stage of the multi-stage compression proceeds at a comparatively slower travel and is largely used to continue to maintain this intimate contact between the cooling and shrinking polymer mass and the mold surfaces to avoid pre-release and optical distortions.

This optional but preferred multi-stage CNC controlled compression can consist of any practical number of intermediate steps but will preferably consist of at least one relatively fast travel step followed by a relatively slower travel step to maintain molded part shrinkage control throughout the cooling process until the point when the molded part is well beneath its glass transition temperature and ready to be ejected.

6. Cooling and Ejection

Following the preferably multi-stage compression and gradual cooling of the polymer, solidification and cooling are completed to the point where the molded parts can be safely ejected from the mold, at which time the molding machine clamp is opened to its full-open position and conventional ejection mechanisms are employed. Meanwhile, during cool-down, the plasticating screw is preparing and metering the next shot for delivery on the next molding cycle.

Important features, therefore, are the resilient members which are used to create the variable volume, over sized mold cavities and are not used primarily to control shrinkage. The latter function is accomplished by utilization of the molding machine's clamping force exerted in CNC-controlled motions (preferably, by the movable clamp) which, in sum, comprise the cavity pre-fill stroke length. Also, since clamping force motion is the driving force for compression, all cavities in a multicavity mold design (inherently rigidly coupled to said clamping force element) will see the same compressive forces delivered at the same instant in time, through its rigid relationship with the movable optical die inserts. That is, all of the die inserts are preferably "commonly" acted upon by the main clamp force of the CNC machine.

Cavity filling is still conducted at the desirably low injection pressures claimed elsewhere, but additionally the process is not dependent upon commencing compression by means of some pre-set time interval, with its inherently high level of error and suboptimum condition, but rather is determined by the comparatively precise method of sensing screw position (which can be controlled to 0.1 mm) and which is digitally settable by the CNC process controller.

It should again be emphasized that the steps outlined above are not essential they are offered merely to indicate in a general way preferred embodiments of the invention.

BRIEF DESCRIPTION OF THE DRAWING

The invention is further explained with reference to the Drawing which depicts preferred embodiments of the invention, and in which:

FIGS. 2 through 8 show the stages of operation of a preferred plate assembly of the injection/compression system of FIG. 1;

FIGS. 10A and 10B show side cross-sectional views of the stationary and movable mold plates (and related components) shown in FIGS. 9A and 9B, respectively, wherein FIG. 10A is taken substantially along broken line A—A in FIG. 9A and FIG. 10B is taken substantially along broken line B—B in FIG. 9B;

FIGS. 12A and 12B show side cross-sectional views of the stationary and movable mold plates (and related components) shown in FIGS. 11A and 11B, respectively, wherein FIG. 12A is taken substantially along broken line A—A in FIG. 11A and FIG. 12B is taken substantially along broken line B—B in FIG. 11B.

DETAILED DESCRIPTION OF PREFERRED EMBODIMENTS

Figure 1:
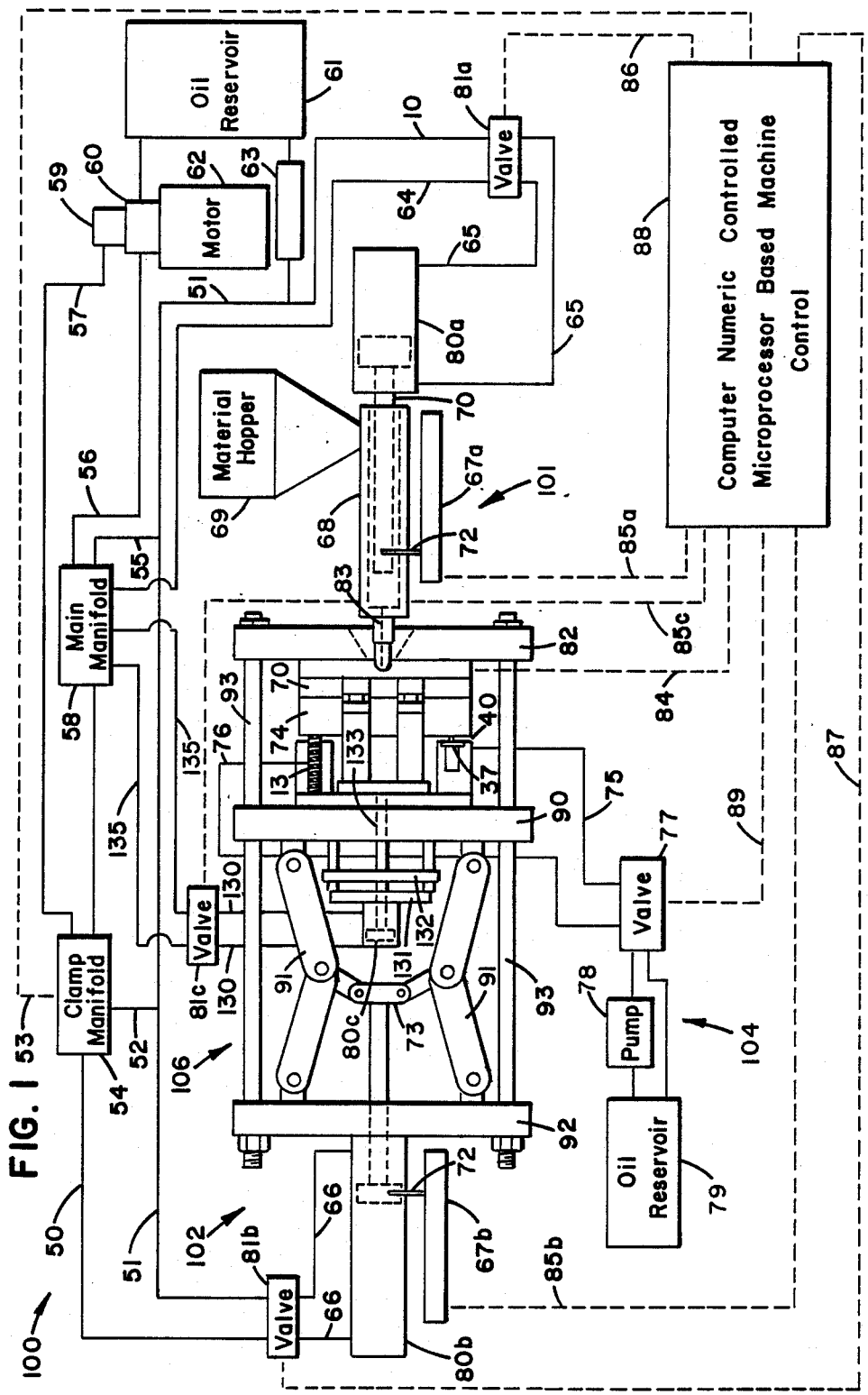
FIG. 1 shows a diagrammatic view of an entire injection/compression system according to the present invention.

The following is a detailed description of preferred embodiments of the present invention. Those skilled in the art will recognize that the invention can be practiced using other embodiments; the claims, not the preferred embodiments, are indicative of the extent of the invention. The description is made with reference to the Drawing, wherein like reference numerals represent like parts and assemblies throughout the several views.

1. Injection/Compression Molding System

FIG. 1 diagrammatically illustrates a preferred multicavity injection/compression thermoplastic molding system 100 which includes as its major components a plasticizing and injecting unit 101; a clamp system 102; a cavity enlargement system 104; an ejectorassembly; and a control system 88. The clamp system 102 includes a platen assembly 106 having mold plates and inserts which form a mold cavity. The cavity enlargement system 104 acts to reversibly and controllably enlarge the molding cavity to prepare it for a thermoplastic melt shot. And, the plasticizing and injecting unit 101 is responsible for preparing and injecting a shot of melt substantially equal or slightly larger in volume to the finished part. All of the components and systems discussed above are preferably coupled, either directly or indirectly, to the control system 88, with the controller 88 being responsible for controlling and synchronizing the activities of all of the remaining components and systems of machine 100. Each of the major components is described below in some detail, along with the interaction of the components and their operation.

The plasticizing and injecting unit 101 is suitable for preparing a homogeneously-plasticized thermoplastic polymer, such as polycarbonate. The unit 101 preferably includes a barrel-and-screw plasticizer 68 of the type used in a conventional injection molding machine. However, for optical molding generally, maximum melt homogeneity (i.e., freedom from "unmelt" or solid polymer particles) and thermal uniformity (minimal temperature variation from start to end of shot delivery) are required. Thus, as well known to those skilled in the art of optical molding, plastication units on conventional injection-molding machines are usually modified by such means as down-sized barrel-and-screw combinations, special screw designs employing controlled shear or melt-barrier features, starve-feeding of pellets, melt-reservoir or accumulator stages, for example. Such well-known modifications are employable and suitable in the practice of the present invention.

Barrel-and-screw plasticizer 68 receives polymer pellets from a hopper 69 and is actuated by a hydraulic cylinder 80a. Extension and retraction of cylinder 80a are controlled by hydraulic fluid supplied through lines 65 by valve 81a, which in turn is controlled by control system 88 via signal flow path 86. Feedback to control system 88 indicative of piston position is provided by a transducer 67a as further discussed below.

The plasticizer/injector unit 101 preferably includes means to precisely accumulate and deliver the desired volume of plasticized melt. In preferred embodiments, this involves a reciprocating-screw injection unit with digitally-settable and readable screw position to a resolution of 0.1 mm, with plasticized melt being accumulated ahead of the screw tip in preparation for injection of the next shot. Screw position is preferably monitored using the transducer 67a which could be a linear potentiometer, a "temposonic," or an optical encoder, for example. Preferably, transducer 67a is a Series DCTM Linear Displacement Transducer sold by Temposonics Incorporation, Plainview, N.Y. The output of transducer 67a is delivered to controller 88 through signal flow path 85a. As explained further below, when transducer 67a signals the melt has nearly been completely delivered to the mold cavities, the compression portion of the process is commenced.

Injection fill rate is preferably high in comparison to prior art fill rates for coining or injection/compression molding and is desirably digitally-settable and profileable. A wide variety of commercially available injection-molding machines offer such process-control features and, in general, these machines (or commercially available retrofits providing equivalent function) are designated generically as CNC (Computer Numerical Control) machines.

Still referring to FIG. 1, the clamp system 102 includes the platen assembly 106 and a clamp actuation system in operative connection with the platen assembly 106. The clamp system forms the mold cavities which receive the melt generated in plasticizer unit 101. The clamp actuation system includes a hydraulic cylinder 80b which responds to hydraulic fluid supplied by a control valve 81b through hydraulic lines 66. Control valve 81b is itself controlled in a similar manner to valve 81a of the melt injector 101: the valve 81b is actuated by control system 88 which receives feedback indicative of piston position from a transducer 67b. Signal flow path 85b couples control system 88 with transducer 67b whereas signal flow path 87 interconnects valve 81b and controller 88. High pressure hydraulic oil is supplied to valve 81b by line 50, and line 51 provides a return. A conventional electric motor/pump system provides oil at the necessary pressure and flow rate. Valves 81a and 81b are preferably ratioing proportional valves. Such valves can be purchased from Rexroth Corporation, Bethlehem, Pa. Transducer 67b, like transducer 67a, is preferably a Temposonics DCTM Linear Displacement Transucer.

The clamp system 102 is preferably the clamp portion of a CNC controlled injection molding machine. Traditionally, such machines strictly focused upon controlling the injection end of the molding machine via fast-responding valves (servo or cartridge types) and pumps (steppable or variable-volume). Recently, however, various molding machine manufacturers have similarly introduced such digital controls of clamp position and motion/velocity profiles to, first, hydraulic clamp machines, and recently, toggle-clamp machines. Both types are usable in the practice of the present invention. However, suitably-equipped toggle machines are preferred, for several reasons, including:

1. Hydraulic cylinder motion to movable platen motion is one-to-one in hydraulic clamp machines, whereas mechanical leverage advantage of the toggle machine allows for a 1:16-20 relationship to exist. Thus, positional error of the digitally-settable and trackable hydraulic cylinder motion is correspondingly reduced in the case of such toggle-clamp machines, but is 1:1 replicated in the case of the hydraulic-clamp machine.

2. By the nature of the mechanical clamp linkage employed by a toggle machine, it will provide inherently better platen parallelism, a particularly important feature in a multi-cavity molding machine.

Referring again to FIG. 1, the platen assembly 106 preferably includes a stationary mold platen 82; a movable mold platen 90; and a clamp toggle platen 92. The platens 82, 90 and 92 are mechanically linked by a set of tie bars 93, the stationary platens 82 and 92 being rigidly connected to the tie bars 93 and the movable platen 90 being slidably connected to the tie bars 93 between platens 82 and 92.

Extending between the stationary toggle platen 92 and the movable mold platen 90 are two pairs of clamp toggle members 91. The pivot points formed by associated clamp members are spanned by a clamp crosshead assembly 73 which is acted on by the piston of cylinder 80b. As is well known, when the hydraulic piston/cylinder unit 80b elongates, this causes the associated clamp members 91 to come more into alignment, which causes the movable mold platen 90 to approach the stationary mold platen 82. Conversely, when cylinder 80b shortens or contracts associated toggle members 91 "toggle" to withdraw platen 90 from platen 82. Such toggle clamp mechanisms can generate well in excess of one hundred tons of clamp force with 100-450 tonnage clamp machines common. And, CNC programmable toggle-clamp injection molding machines are readily available.

Figure 2:
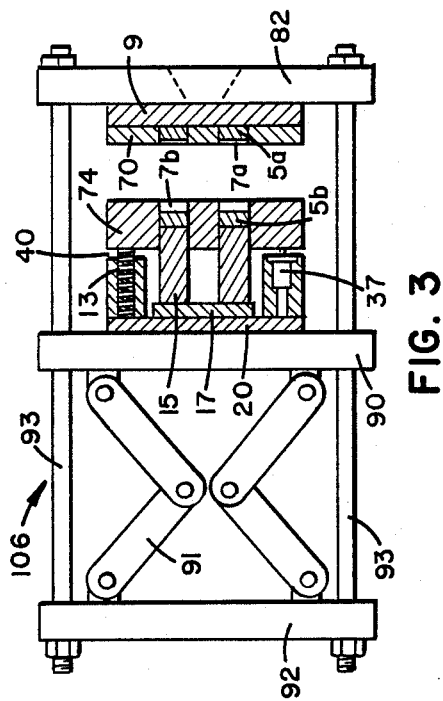

Attention is now turned to the cavity enlargement system 104. This system preferably functions to selectively enlarge the mold cavities so that melt can enter them without encountering significant flow resistance or back pressure. Referring again to FIG. 1, the cavity enlargement system 104 preferably includes a hydraulic system including a three-way solenoid 77 which is connected to controller 88 by signal flow path 89. Under the command of controller 88, the valve 77 provides hydraulic fluid to a set of plate retention devices 37 and a set of "resilient members" 13 operatively mounted on either platen but preferably on the movable mold platen 90 as shown in FIG. 2 (A stack mold design would employ such members and related enlargeable cavity subassemblies on both movable and stationary platen sides of the parting line). The valve 77 supplies fluid to the resilient members 13 while simultaneously venting the plate retention members 37, and vice versa. "Resilient members" 13 can simply be compression springs having very high elastic moduli. Preferably, however, the resilient members 13 are hydraulic cylinders which can be selectively extended upon receiving hydraulic fluid from valve 77. The purpose and operation of these "resilient members" 13 and plate retention devices 37 are further described below.

The molding machine also preferably includes a hydraulically-actuated ejector assembly. The ejector assembly, shown in FIG. 1, includes a ratioing valve 81c which is the functional equivalent of valves 81a and 81b. Hydraulic lines 130 from valve 81c feed a double-sided hydraulic ram 80c which actuates a plate 132 slideably disposed in relation to a mount housing 131 and the movable platen 90. The plate 132 in turn is connected to and actuates a push bar 133 which extends through the movable platen 90 and which acts on components interval to the mold to effect part ejection. The valve 81c is connected by signal flow path 85c to controller 88, and controller 88 activates it to eject the finished parts.

A substantially conventional hydraulic system supplies pressurized hydraulic fluid to the ratioing valves 81. The hydraulic system includes an oil reservoir 61 coupled to a relatively low pressure, high volume pump 60 and a relatively high pressure, low volume pump cartridge 59. The pumps 59 and 60 are commonly driven by an electric motor 62.

The high volume pump 60 feeds a "passive" manifold 58 via line 56. "Passive" manifold 58 in turn distributes the low pressure hydraulic fluid to an "active" manifold 54 and the control valve 81b. "Active" manifold 54, also supplied with high pressure hydraulic fluid by high pressure pump 59, is connected via signal flow path 53 to controller 88. The controller 88 can signal manifold 54 to supply either high pressure, low volume oil or low pressure, high volume oil to the control valve 81b to precisely profile the application of clamp pressure. Whereas conventional injection molding machines never make large demands of hydraulic pressure and flow simultaneously at both injection (cylinder 80a) and clamp (cylinder 80b) ends, such is exactly the case in preferred embodiments of the present invention, whereby compressive clamping force and motions commence before rapid injection fill is completed. In order to thus satisfy both cylinders 80a and 80b hydraulic requirements at any point in the process sequence for hydraulic fluid volume and pressure, clamp manifold 54 is a desirable addition, working in combination with main manifold 58 and pumps 59 and 60. Manifold 54 thus supplements and isolates as needed the clamp cylinder 80b and valve 81b from the main hydraulic circuit and manifold 58. The exhausts of valves 81 and manifolds 54 and 58 are connected to a conventional hydraulic oil heat exchanger 63 which in turn is connected to the oil reservoir 61.

Thus, control system 88 is coupled (directly or indirectly) to and controls the position and velocity of movable mold platen 90 (through control of valve 81b and "active" manifold 54); the operation of cavity enlargement system 104; and the operation of plasticizing/injecting unit 101. It preferably also controls the temperature of the moldset and a part ejection mechanism, as further described below. The control system 88 could be any of a large variety of control systems and, in fact, it could conceivably be hydraulic, mechanical or pneumatic in nature. Clearly, however, the preferred control system 88 includes electronic circuitry. A "hard wired" system could be devised to accomplish the control functions of control system 88. Also, a programmable CNC injection molding machine could be programmed to accomplish the various tasks assigned to control system 88. The latter alternative is preferred. And, while the precise computer program for such a control system is not herein disclosed, those skilled in the art of CNC programming will readily understand how such a program could be devised without undue experimentation in view of the detailed discussion of the invention set out herein.

Molding machine process controller 88 should minimally:

1. respond to digitally settable operator input values for position, time, velocity, pressure temperature, and settable sequences or modes thereof, 2. transmit same thru control signal flow paths 84, 85a, 85b, 86 and 87 as well as, 3. respond interactively to actual real time measurements of these same parameters, by comparing such measured values from sensors such as 67a and 67b against desired values for same.

Additional but optional functions of controller 88 include memory or data storage, presenting actual parameter values in real time via CRT display screen, compiling such production data into certain formats for supervisory review, and transmitting or receiving electronic manifestations of such data or parameter values through an on-line network or electronic linkage between equivalent such machines and/or a heirarchial control/reporting supervisory terminal.

Such controllers 88 include but are not limited to both factor-installed and field-retrofit CNC (Computer Numeric Control) or microprocessor-controlled molding machine process controllers, of which there are commercially available a number of such domestic and foreign manufactured brands, for toggle and hydraulic type clamp machines.

A device which could be used as controller 88 is the CAMAC XT Series controller available from Cincinatti Milicron company of Cincinnati, Ohio, for use in conjunction with its injection molding machines.

2. Platen Assembly

A more detailed description of preferred platen assembly 106 is now offered with reference to FIG. 2, wherein clamp crosshead assembly 73, and other components and systems in operative contact with platen assembly 106 are omitted for the sake of clarity. As noted above, platen assembly 106 includes stationary and movable mold platens 82 and 90, respectively. The movable mold platen 90 can be precisely moved in relation to the stationary mold platen 82 under the supervision of control system 88. Stationary mold platen 82 supports a stationary clamping plate 9; similarly, movable mold platen 90 supports a movable clamping plate 20. Immediately adjacent stationary clamping plate 9 is an "A" mold plate 70 which holds a plurality of "A" die inserts 5a. Similarly, the movable mold platen 90 and the movable clamping plate 20 support a "B" mold plate 74 which slidably houses a plurality of "B" die inserts 5b. Separating the "B" mold plate 74 from the movable clamping plate 20, however, are the resilient members 13. The die inserts 5a and 5b form mold cavities 7a and 7b, respectively. Those skilled in the art will recognize that members 13 and their associated components (which together form enlargable variable volume cavities 7) could be supported alternatively by the stationary platen 82. Preferably, however, the resilient members 13 are associated with the movable platen 90.

The movable platen 90 also preferably supports an ejector assembly which includes an ejector plate 17 and die pillars 15 extending therefrom in conventional fashion.

By virtue of the "resilient" members 13, the "B" mold plate 74 is movable relative to the ejector assembly and the "B" die inserts 5b. Furthermore, the ejector assembly is movable relative to the "B" mold plate 74 and the movable clamping plate 20. The mechanism for so moving the ejector assembly is not illustrated, but preferably includes a small hydraulic cylinder which can be independently actuated upon command of the control system 88. It should be noted that the injection/compression molding system 100 and the preferred platen assembly 106, as thus far described, could be used to mold a large variety of articles.

3. Lens Mold

Figure 9A:
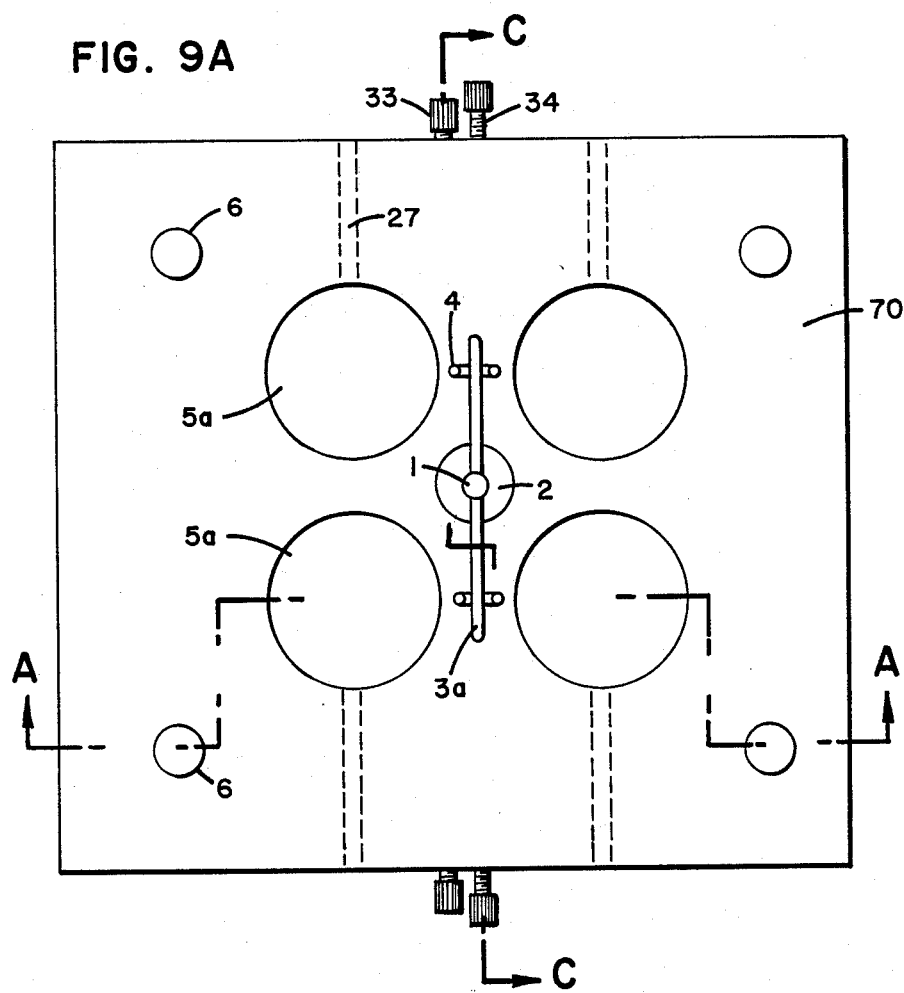
FIGS. 9A and 9B show plan views of preferred stationary and movable mold plates (and related components) respectively, of a lens molding system according to the present invention.
Figure 10A:
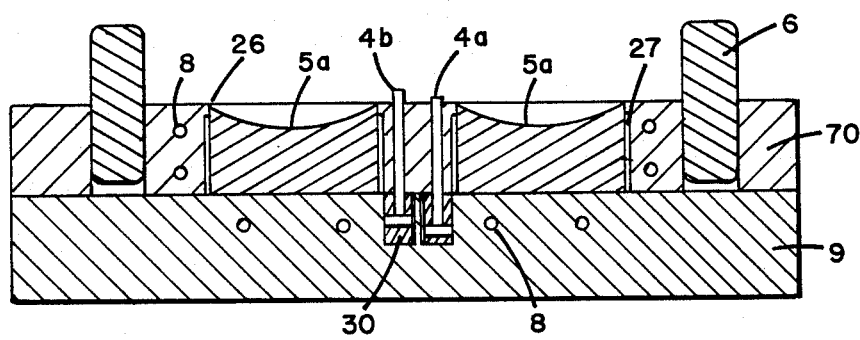
Figure 9B:
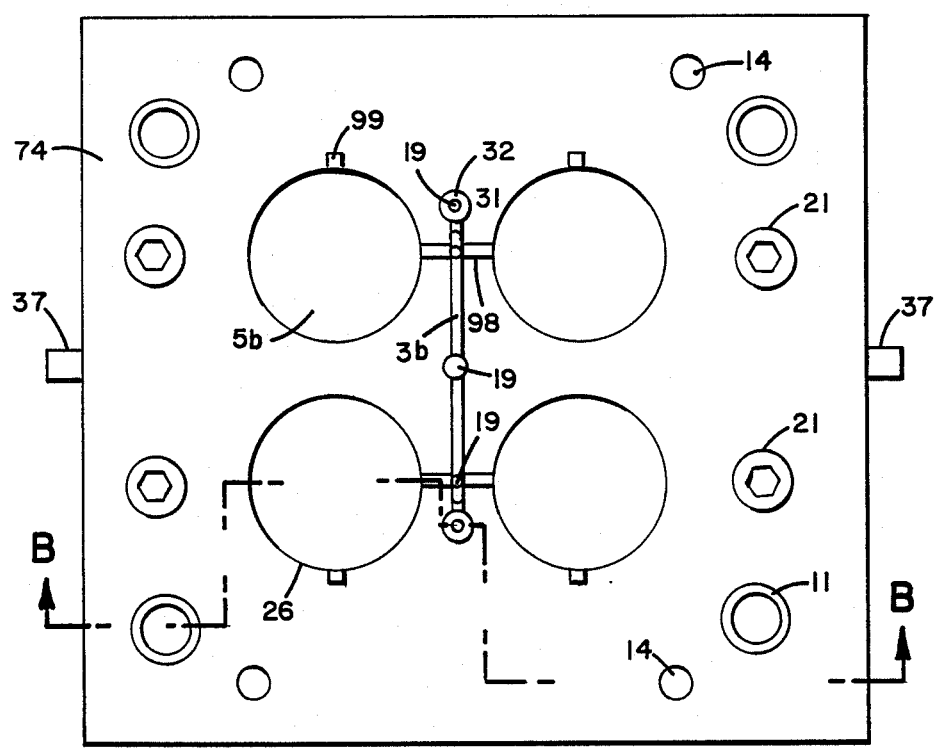
Figure 10B:
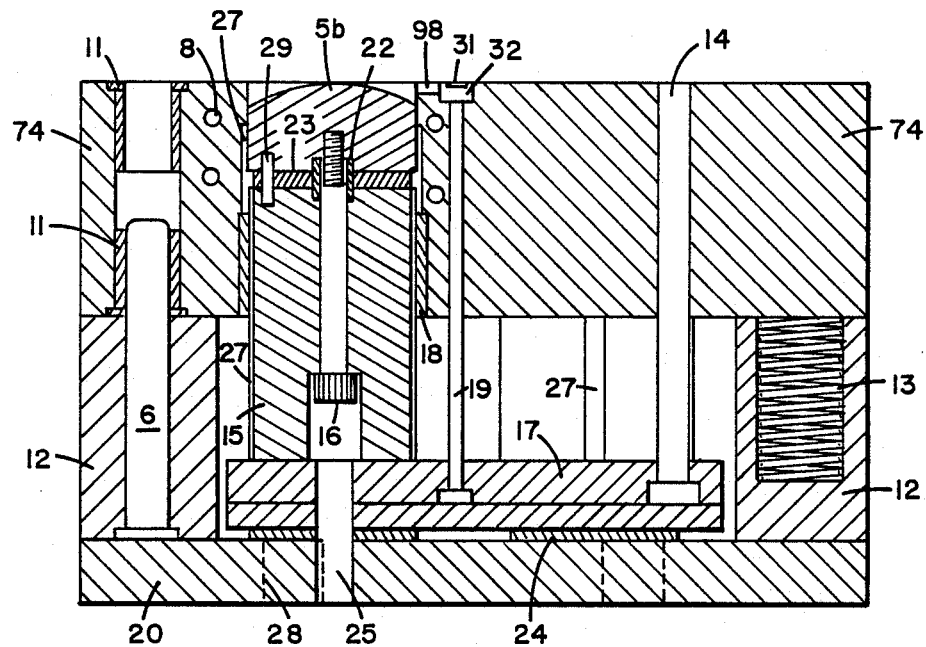

FIGS. 9 and 10 illustrate preferred mold parts of a lens making machine according to the present invention: FIGS. 9A and 10A illustrate the components of the mold that are supported by the stationary mold platen 82 whereas FIGS. 9B and 10B show the portions of the mold supported by the movable mold platen 90. As noted above, the present invention contemplates the interchange (including sequenced and controlled relative motions and positions) of selected components between the platens 82 and 90; the following description focuses on the preferred embodiment, not the sole embodiment of the invention.

Referring to FIGS. 9A and 10A, as discussed above the stationary clamping plate 9 supports the "A" mold plate 70 which in turn houses a set of die inserts 5a. The die inserts 5a are preferably made from high quality tool steel, other tool-grade metal alloys or from glass or ceramic and possess an optical surface suitable for imparting same to a molded lens. Inserts 5a are preferably slip fit into the "A" mold 70, there existing venting gap 26 at the perimeter between inserts 5a and "A" mold plate 70. The venting gaps 26 are preferably 0.001 to 0.002 inch wide, sufficient to prevent the escape of melt while permitting gases to vent. Venting gaps 26 are in fluid communication with venting slots 27 (which have larger dimensioned openings or clearances) (see FIG. 9A) and the molding cavities 7 are thereby vented. The embodiment shown in the Drawing is a four-cavity mold, but those skilled in the art will recognize that a larger or smaller number of cavities could be employed.

The stationary clamping plate 9 and the "A" mold plate 70 are bored to form a continuous sprue 1 (shown in FIG. 9A). A sprue bushing 2 is contained in the "A" mold plate 70 and serves to precisely define and maintain the orifice size of the sprue and to seat against the molding machine's nozzle. As shown in FIG. 9A, the sprue 1 is in fluid communication with a runner system 3a which carries the melt from the central sprue radially out to the mold cavities. The runner system 3a is formed by a precise groove in the surface of the "A" mold plate 70. A corresponding groove 3b is formed by the "B" mold plate 74 and together these grooves 3 serve to distribute the melt from the sprue 1 to the plurality of mold cavities (four cavities being shown in the Drawing). Conventional gates 98 interconnect the runners 3 and the mold cavities 7.

Referring to FIG. 9B, extending from the intersections of gates 98 and runners 3 are pressure relief ports 31. These ports 31 terminate in excess polymer collection chambers 32, further discused below. Conventional ejectors pins 19 selectively push solidified polymer out of the polymer collection chamber at the appropriate time.

Referring to FIGS. 9A and 10A, the preferred embodiment includes flow restrictive members 4 which can be adjusted to ensure that each mold cavity receives the appropriate amount of melt. The flow restrictive members 4 extend into the runner system 3 so as to adjustably impede the flow of melt to their respective mold cavities. The impedance presented by each flow restrictive member 4 depends on the degree to which it is inserted into the gates 98. Thus, referring to FIG. 10A, flow restrictive member 4a will impede the flow of melt to its associated mold cavity to a lesser degree than flow restrictive member 4b to its associated mold cavity.

Figure 13:
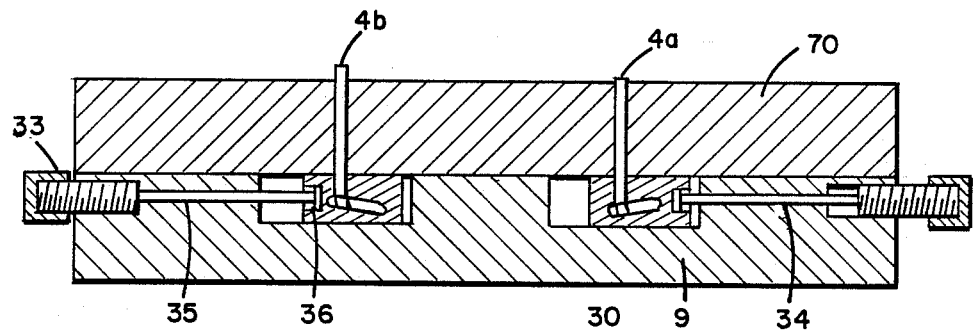
FIG. 13 is a side cross-sectional view of the stationary lens mold plates of FIG. 9A and 10A taken substantially along broken line C—C of FIG. 9A.

The flow restrictive members 4 are preferably infinitely adjustable. Referring in particular to FIG. 13, associated with each flow restrictive member 4 is preferably a cam 30. Each cam 30 has an inclined groove which holds captive an extension of the associated member 4, such that movement of the cam 30 parallel to the parting line or plane causes movement of the member 4 in a direction perpendicular to the parting plane. Each cam 30 is preferably coupled to a shaft 35 which extends through the stationary clamping plate 9 to on adjustment knob 33. Thus, by rotating the knobs 33 the positions of the individual flow restrictive members 4 can be independently and precisely controlled.

It should be noted that mold balancing is particularly critical when different lens configurations are being simultaneously molded. That is, some lenses have larger volumes than other lenses. Also, some lenses have restrictive portions which present larger impedances to the melt flow. Thus, so that each mold cavity receives a melt volume substantially equal to the volume of the finished lens, the flow restrictive members 4 are adjusted to compensate for differences in the mold cavities.

The stationary clamping plate 9 and "A" mold plate 70 also include conventional coolant flow channels 8. Liquid can be pumped through flow channels 8 to heat or cool the mold in accordance with well-known molding practices. It should be noted that other heating-/cooling means could be employed.

Finally, a plurality of conventional leader pins 6 extend from the surface of "A" mold plate 70. These leader pins 6 serve to register the opposing die inserts 5a and 5b as the mold is closing and when the mold is in its closed state.

Figure 14:
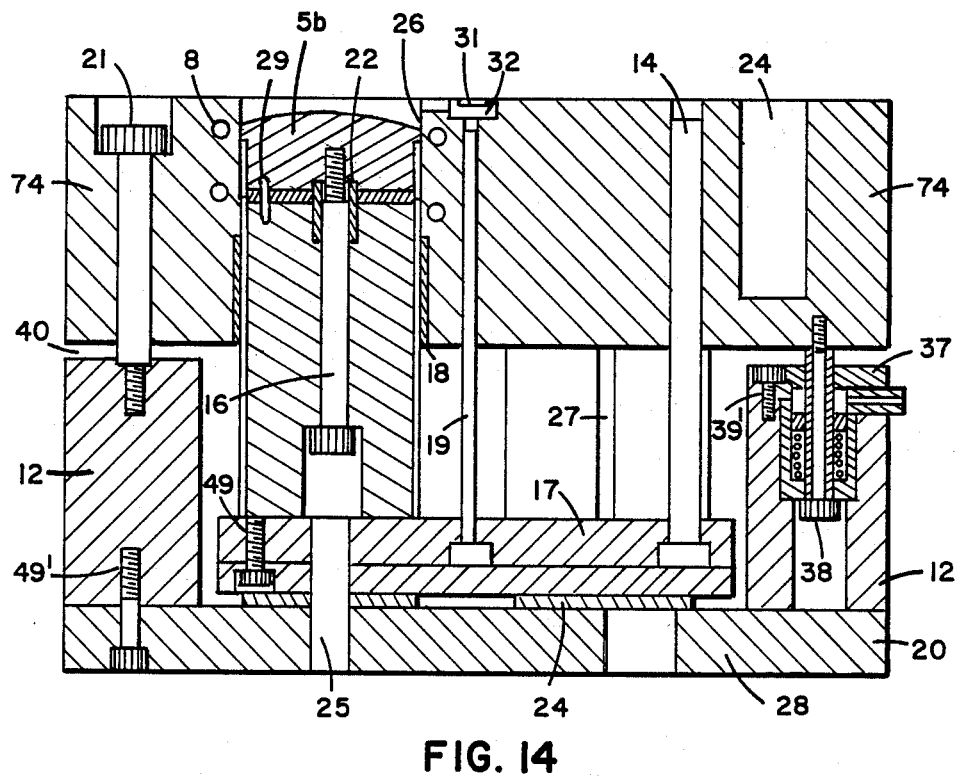
FIG. 14 is another side cross-sectional view of the movable lens mold plate, similar to FIG. 9B, with the mold plate retention mechanism being shown.

The movable part of the lens mold is shown in FIGS. 9B and 10B. Referring to FIG. 9B, "B" mold plate 74 forms leader pin openings lined with leader pin bushings 11 suitable for slideably accepting the leader pins 6 extending from "A" mold plate 70. FIG. 9B also illustrates the runner system 3b formed by a groove in the surface of plate 74. This groove registers with groove 3a of plate 70 to form the runner system 3. FIG. 9B also illustrates a retention mechanism 37 which could include a mechanical mold plate lock or latch, as well known to the skilled artisan, or a hydraulic cylinder. The latter is preferred, as it can be easily controlled by controller 88 of FIG. 1. As described further below, the optional retention device 37 functions to hold "B" mold plate 74 at a fixed distance relative to clamp plate 20 throughout the part ejection cycle, so the ejection stroke of pillars 15 and inserts 5b provides positive motion relative to plate 74, in both forward and return strokes. FIG. 14 shows a suitable retention mechanism 37 in cross section. Mechanism 37 operates under control of control system 88 by means of hydraulic fluid entering and leaving device 37 through line 75.

Referring to FIG. 10B, as discussed above the "B" mold half includes the movable clamping plate 20 and "B" mold plate 74. The resilient elements 13 are preferably housed within spacer 12 which determines the minimum distance between the movable clamping plate 20 and the "B" mold plate 74. This distance can be increased by the action of "resilient members" 13 which are preferably hydraulic cylinders. When resilient members 13 elongate, the "B" mold plate 74 moves away from the movable clamping plate 20, and therefore away from the movable platen 90.

The ejector assembly (shown diagrammatically in FIG. 1) includes a die insert retainer and ejector plate 17. This ejector plate 17 is selectively movable with respect to the movable clamping plate 20; a clearance hole 28 admits the push bar 133 which effects this relative movement. Prior to ejection of the molded part, however, the plate 17 is preferably held rigidly against the movable clamping plate 20 (unless optional "floating die" means of variable volume cavity formation is chosen) through the retracted position of the ejector system's hydraulic cylinder. Such ejector assemblies and techniques are generally well known in the art.

Extending from ejector plate 17 are die insert support pillars 15 and ejector pins 19. The ejector pins 19 are slidable with respect to the "B" mold plate 74 and make contact with the runner 3 as shown in FIG. 9B. When ejection of the molded part is desired, machine process controller 88 actuates ejection hydraulic cylinder mentioned above, which drives forward the push bar 133 which moves the ejector plate 17 relative to the "B" mold plate 74. This causes the ejector pins 19 to slide within mold plate 74 and exert pressure on the "frozen" material contained within the chambers 32. Simultaneously, die inserts 5b joined rigidly to pillars 15 travel forward an equivalent distance relative to "B" mold plate 74, thus allowing the molded lenses' edges to clear the cavity sides. This combined motion ejects the molded parts without scratching their optical surfaces.

As previously noted, CNC controller 88 of ejector cylinder position and velocity provides an optional means of providing CNC-controlled compressive stroke to all variable volume cavities 7 simultaneously and equally, through rigid connection of inserts 5b, pillars 15, ejector plate 17 to ejector push bar to ejector hydraulic cylinder 7 while relative position of mold clamp plates 20 and 9 is fixed and constant. Theoretically, such an ejector-initiated compressive driving force would be the functional equivalent of the preferred movable-platen-initiated compressive driving force, since both can be digitally settable and controlled for position and velocity through preferred CNC controllers 88 and since in both cases the rigid connection of these machine-supplied (as opposed to auxillary equipment-supplied) compressive driving forces to the movable dies 5b in either single cavity or multi-cavity mold designs would have exactly equal, simultaneous and predictable effects on the various mold cavities' 7 respective volumes (unlike prior art auxillary equipment for in-mold coining). However, in practice, use of movable platen-initiated compressive or clamping driving forces is preferred since injection machines aren't equipped with as large and robust ejector cylinders as their respective clamp cylinders 80b. Since standard factory equipped clamp cylinders 80b are generously sized and offer multiples of the required tonnage forces needed even in the most demanding use of compression (i.e., very thin Rx lenses of high minus power), and are built for heavier duty usage, they are better suited and more maintainable for providing compressive driving force than is the machine's hydraulic ejector cylinder. In addition, using the hydraulic ejector cylinder for compression will necessarily require complicating its molded-part ejection function, which will have to be mechanically or electronically decoupled from its compressive function, as the two functions are sequenced dissimilarly. A final disadvantage of using ejector cylinder motion for 1:1 compressive clamping is that toggle clamp compression uses mechanical advantage to reduce positional sensing error (as is true also when compared earlier to hydraulic clamp machines versus toggle clamp machines).

In spite of the perceived disadvantages ff the "floating die" embodiment, it too provides for rapid filling of the mold cavities. As the cavities fill the floating die inserts simultaneously move to allow for rapid filling without causing significant back pressure to develop in the melt. Back pressure is considered "significant" when it begins to affect the optical quality of the finished parts.

As noted above, pillars 15 also extend from ejector plate 17. Pillars 15 basically serve to transmit the clamping force from the ejector plate 17 to the die inserts 5b. Preferably, shims 23 separate pillars 15 from respective inserts 5b. In addition, an indexing pin 29 reaches axially from each pillar 15 to each respective insert 5b. Pins 29 hold the inserts 5b stationary relative to pillars 15 as they are threadedly engaged by retention bolts 16.

FIG. 10B also illustrates venting slots 27, coolant channels 8 in the "B" mold plate 74, and ejector plate supports 24. Venting slots 27 are in fluid communication with venting gaps 26 between the inserts 5b and the mold plate 74. Gaps 26 are preferably 0.001 to 0.002 inch, like the gaps 26 in the mating mold plate (in both the stationary and the movable portions of the mold). Venting slots 27 are unique in that they vent the entire periphery of the inserts 5b so as to increase fill rates by reducing back pressure. Coolant channels 8 and plate supports 24 are conventional.

4. Disk Mold

Figure 12B:
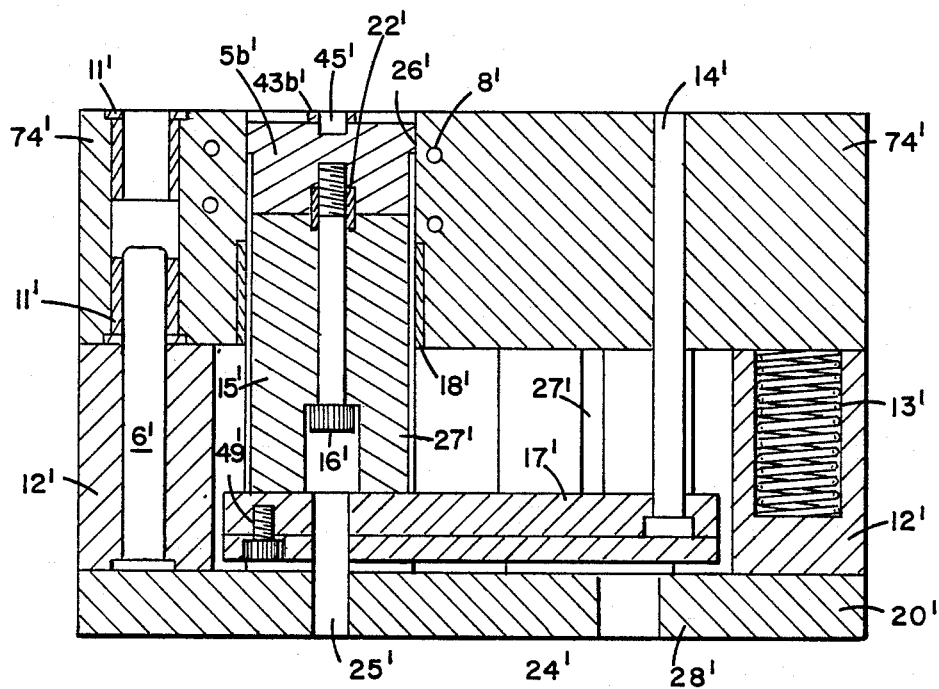
Figure 11A:
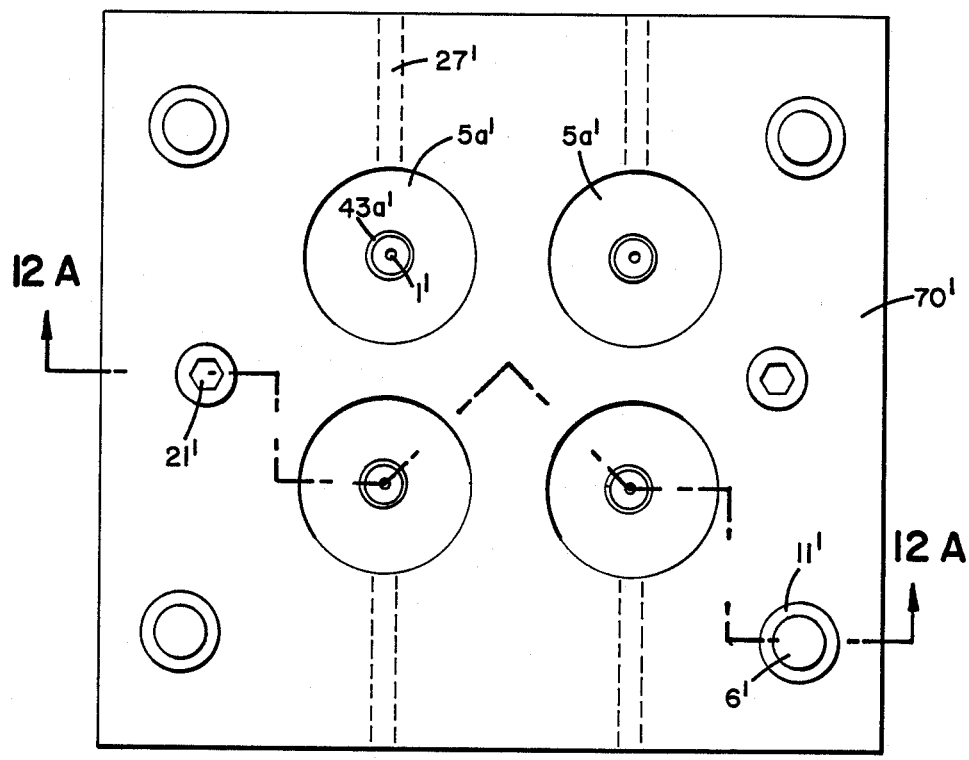
FIGS. 11A and 11B show plan views of preferred stationary and movable mold plates (and related components), respectively, of a disk molding system according to the present invention.
Figure 12A:
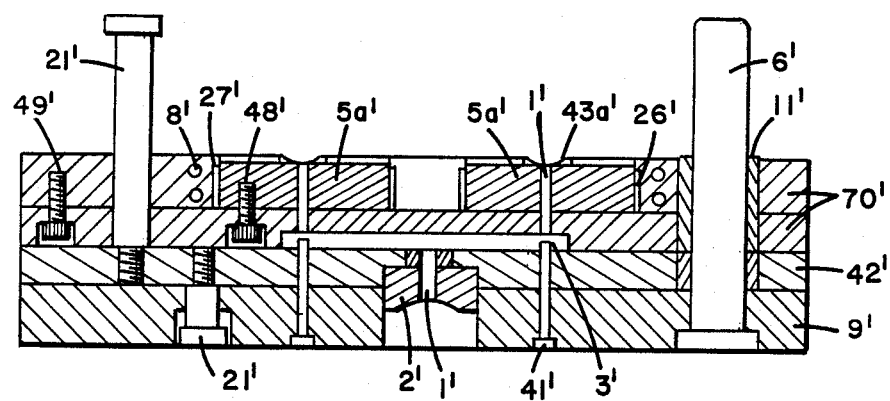
Figure 11B:
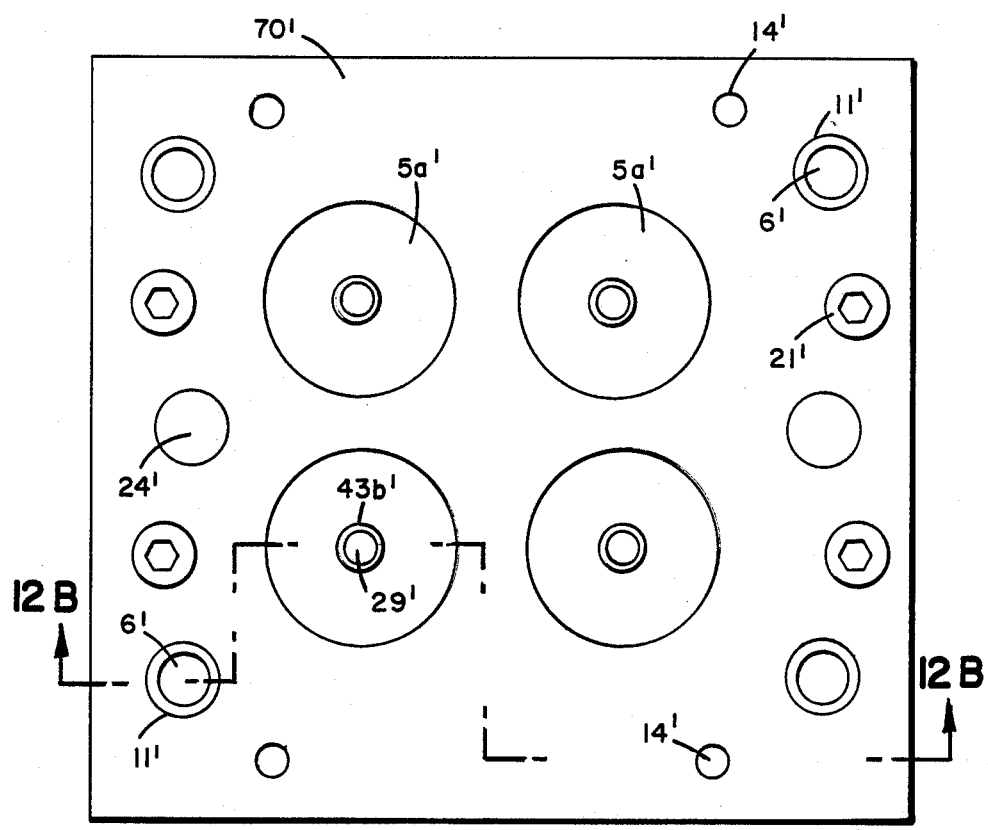

FIGS. 11 and 12 illustrate preferred mold parts a disk making machine according to the present invention: FIGS. 11a and 12a illustrate the components of the mold that are supported by the stationary mold platen 82 whereas FIGS. 11B and 12B show the portions of the mold supported preferably by the movable mold platen 90. "Primes" are added to the reference numerals to differentiate the disk mold parts from the lens mold parts discussed above. The mold platens 82 and 90 and some other common parts will not be so differentiated, however.

Referring to FIGS. 11A and 12A, as discussed above the stationary clamping plate 9' supports the "A" mold plate 70' which in turn houses a set of die inserts 5a'. The die inserts 5a' are preferably made from a high quality tool steel or tool grade metal alloy and possess an optical surface suitable for imparting same to a molded disk. One of the inserts 5' of each pair of inserts 5a' and 5b' may additionally be fitted with a stamper (not shown) the function of which is described previously. Inserts 5a' are preferably slip fit into the "A" mold 70', there existing ventings gaps 26' at the perimeter between inserts 5a' and "A" mold plate 70'. The venting gaps 26' are preferably 0.001 to 0.002 inch wide, sufficient to prevent the escape of melt while permitting gases to vent. Venting gaps 26' are in fluid communication with venting slots 27' (see FIG. 11A) and the molding cavity is thereby vented. The embodiment shown in the Drawing is a four-cavity mold, but those skilled in the art will recognize that a larger or smaller number of cavities could be employed.

The stationary clamping plate 9' and the "A" mold plate 70' are separated by a stripper plate 42', the plates 9' and 42' being bored to form a continuous sprue 1'. A sprue bushing 2' held by clamping plate 9' serves to precisely define and maintain the orifice size of the sprue and provide positive seating, registration and seal with the machine's injection nozzle (not shown). As shown in FIG. 12A, the sprue 1' is in fluid communication with a runner system 3' which carries the melt from the central sprue 1' radially out to the mold cavities 7'.

Unlike Rx molding, for multi-cavity disk molding, the mold cavities would never be deliverately unbalanced and once the mold is balanced it is unlikely it will have to be rebalanced on a regular basis. Thus, non-adjustable puller pins 41' are probably adequate.

The mold plate 70' also includes conventional coolant flow channels 8'. Liquid can be pumped through flow channels 8' to heat or cool the mold in accordance with well-known molding practices. It should be noted that other heating/cooling means could be employed.

Figure 16:
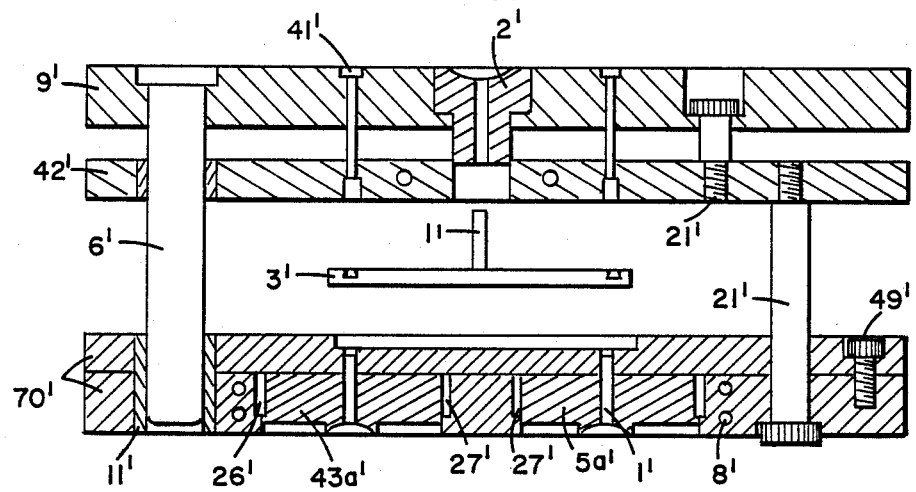
FIG. 16 illustrates the disk mold plates of FIG. 12A in their open state associated with plate ejection.

The stationary or "A" half of the mold depicted in FIGS. 11A and 12A is a conventional 3-plate mold. The assembly includes shoulder bolts 21' which limit the separation of the plates. The 3-plate stack, consisting of plates 9', 42' and 70', separates to an extent determined by the shoulder bolts 21' by virtue of the cohesiveness between the polymer and the inserts 5'. Once the plates have separated to their maximum extent, the parting line will open and the runner 3, will fall free of the sprues 1'. This process is illustrated in FIG. 16.

Finally, a plurality of conventional leader pins 6' extend through "A" mold plate 70'. These leader pins 6' serve to register the opposing die inserts 5a' and 5b' as the mold is closing and when the mold is in its closed state.

The movable part of the lens mold is shown in FIGS. 11B and 12B. Referring to FIG. 11B, "B" mold plate 74' forms leader pin openings lined with leader pin bushings 11' suitable for slideably accepting the leader pins 6' extending through "A" mold plate 70'.

Referring to FIG. 12B, as discussed above the "B" mold half includes the movable clamping plate 20' and "B" mold plate 74'. The resilient elements 13' are preferably housed within spacer 12' which determines the minimum distance between the movable clamping plate 20' and the "B" mold plate 74'. This distance can be increased by the action of "resilient members" 13' which are preferably hydraulic cylinders. When resilient members 13' elongate, the "B" mold plate 74' moves away from the movable clamping plate 20', and therefore away from the movable platen 90.

The ejector assembly (shown diagrammatically in FIG. 1) includes a die insert retainer and ejector plate 17'. This ejector plate 17' is selectively movable with respect to the movable clamping plate 20'; a clearance hole 28' admits a push bar which effects this relative movement. Prior to ejection of the molded part, however, the plate 17' is held against the movable clamping plate 20 through the action of a small hydraulic cylinder (not shown) or the like. Such 3-plate ejector assemblies and techniques are well known in the art.

Extending from ejector plate 17' are four die insert support pillars 15'. Pillars 15' basically serve to transmit the clamping force from the ejector plate 17' to the die inserts 5b'. When ejection of the molded part is desired, the push bar moves the ejector plate 17' forward relative to the "B" mold plate 74'. This causes molded disk 31 to travel past the parting line surface into mold-open "daylight" where it can most preferably be removed by automated robotic arm, grasping either disk outer perimeter (preferred), or sprue (if in-mold coring option is not used). This ejects the molded parts without scratching their optical surfaces.

FIG. 12B also illustrates venting slots 27' circumferentially spaced about inserts 5b' and coolant channels 8' in the "B" mold plate 74'. The venting slots 7' are in fluid communication with the venting gaps 26' between the inserts 5b' and the mold plate 74'. The gaps 26' are preferably 0.001 to 0.002 inch wide like the gaps 26' in the mating mold plate.

Figure 15:
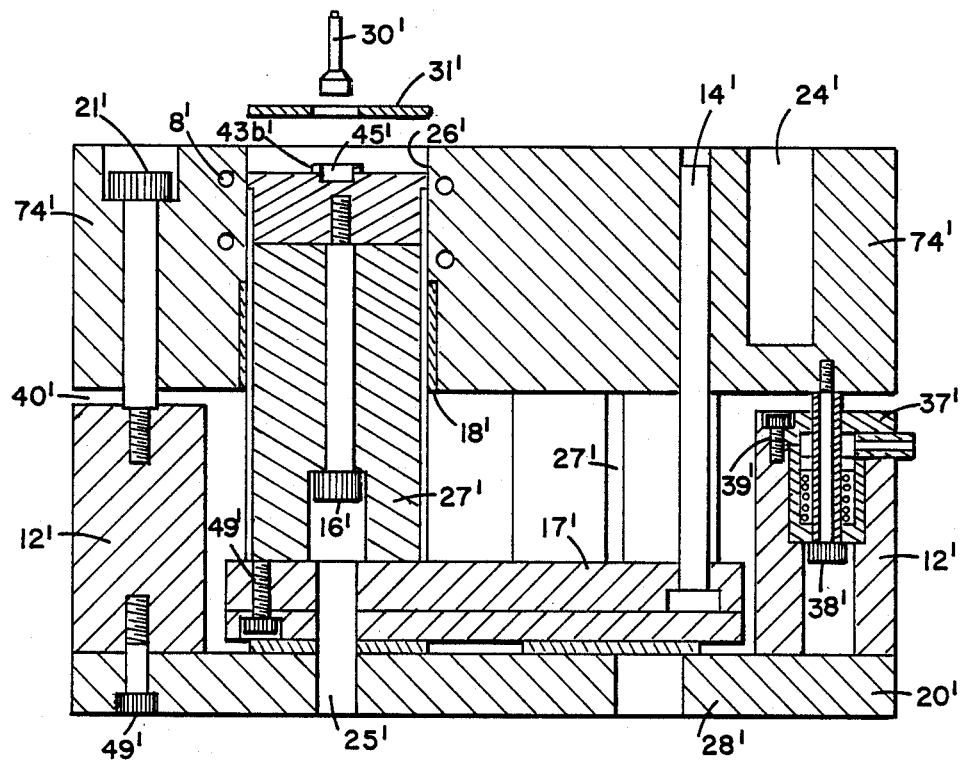
FIG. 15 is another side cross-sectional view of the movable disk mold plate, similar to FIG. 11B, with the mold plate retention mechanism being shown.

FIG. 15 illustrates a retenting mechanism 37' which could include a mechanical mold plate lock or latch, as well known to the skilled artisan, or a hydraulic cylinder. The latter is preferred, as it can be easily controlled by controller 88 of FIG. 1. As described further below, the optional retention device 37' functions to hold "B" mold plate 74' at a fixed distance relative to clamp plate 20' throughout the part ejection cycle, so the ejection stroke of pillars 15' and inserts 5b' provides positive motion relative to plate 74', in both forward and return strokes.

Figure 17:
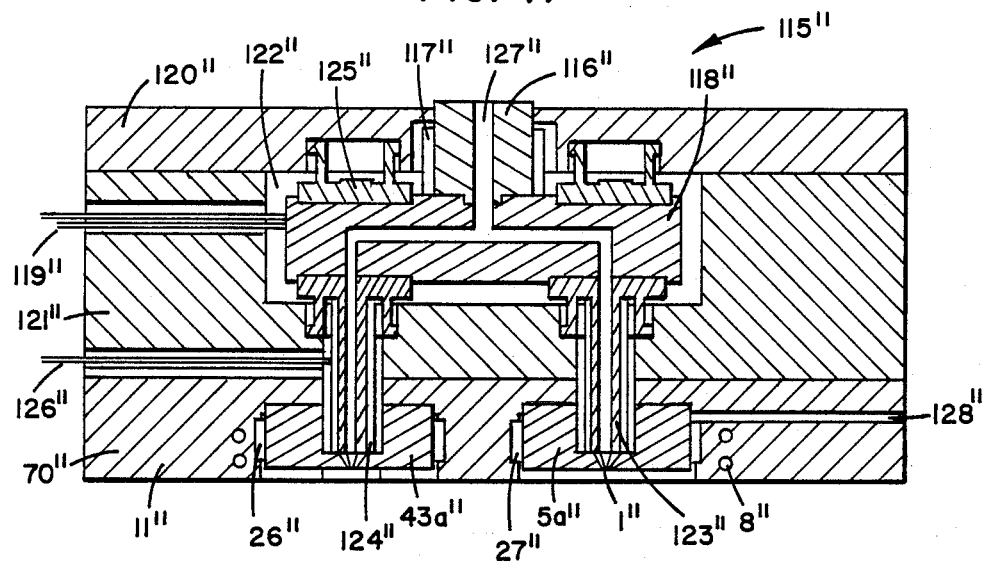
FIG. 17 is a side cross-sectional view of an alternative ambodiment of the stationary mold plate of a disk molding system according to the invention.
Figure 18:
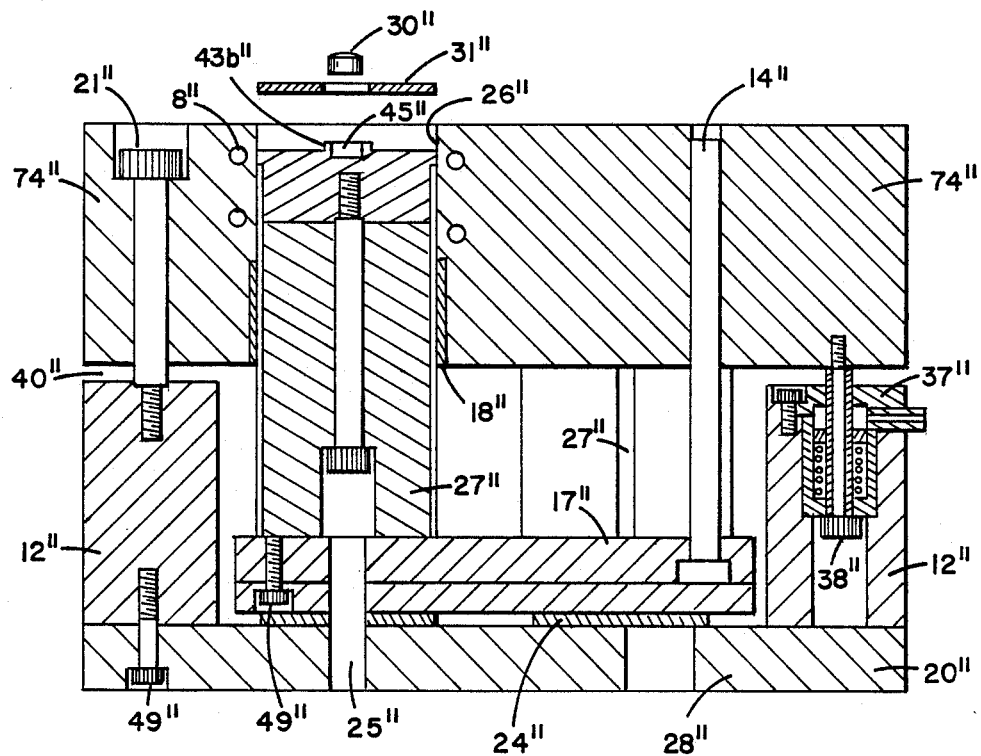
FIG. 18 is a side cross-sectional view of an alternative embodiment of the movable mold plate of a disk molding system according to the invention.
Figure 19:
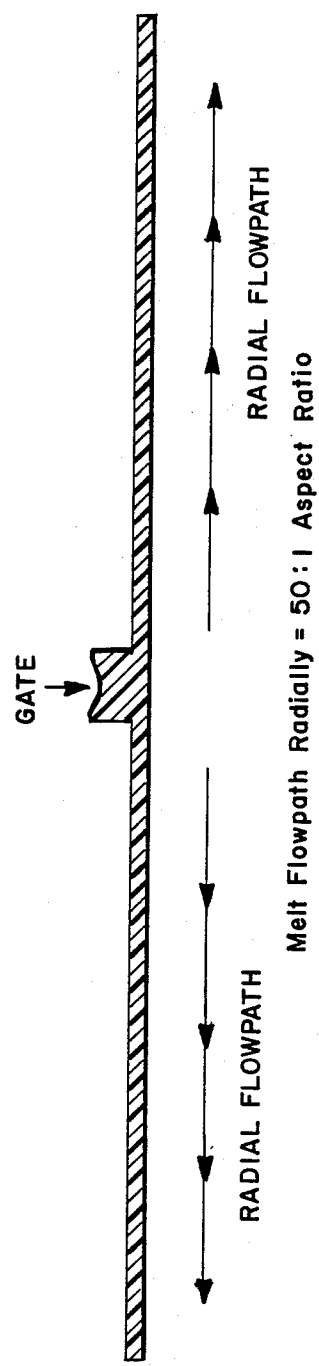
FIG. 19 is a cross-sectional view showing in 2× scale a compact disk and its flowpath.
Figure 20:
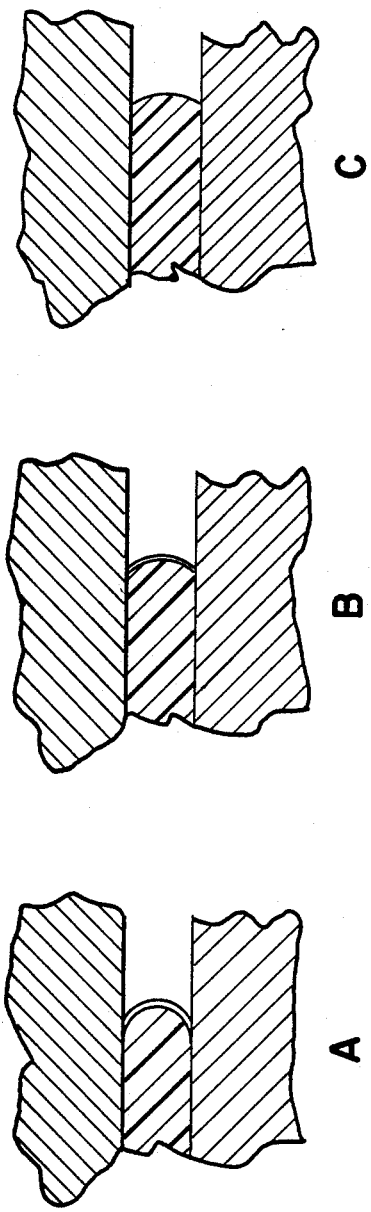
FIG. 20 shows cross-sectional views of three different melt velocity profiles for a given disk mold.

FIGS. 17 and 18 illustrate a hot runner (or "runnerless") embodiment of the disk molding apparatus according to the invention. The reference numbers are "double primed". As the parts of the runnerless embodiment are clear from the drawing and the previous description, no further discussion of this embodiment is needed.

5. Operation

The operation of the injection/compression machine 100 illustrated in the Drawing will now be described. In general, the lens and disk molding processes are identical. Thus, through the reference numbers assigned to the lens mold parts are primarily used, the operation of preferred embodiments of both molding processes are described.

FIG. 2 shows the plate assembly 106 in its full open position following the ejection of the previous molded part. Hydraulic clamp cylinder 80b, under the direction of control system 88, has caused the associated clamp members 91 to buckle, thereby withdrawing the movable mold platen 90 from the stationary mold platen 82. The injection reciprocating screw (not shown) within plastication barrel 68 is in its fully retracted position in preparation for injection of thermoplastic resin. In addition, the ejector assembly is in its fully retracted position relative to the "B" mold plate 74 so that die inserts 5b are well within plate 74. And, resilient members 13 are also in their retracted position; therefore, the mold's "pressing stroke" (distance between spacer blocks 12 and "B" mold plate 74) is equal to 0.00 inch.

Figure 3:
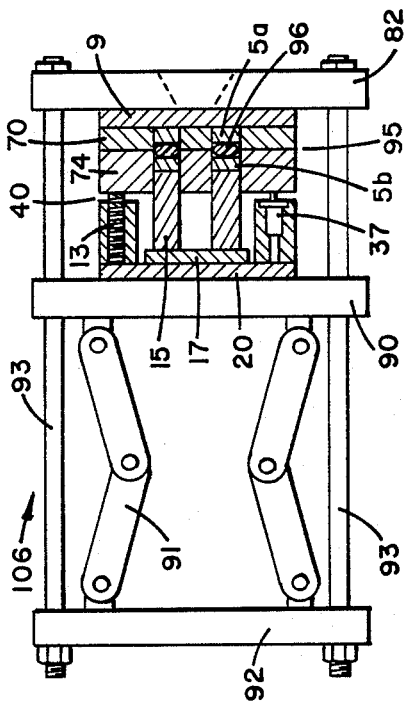

FIG. 3 illustrates the plate assembly 106 prepared for the start of the next cycle. Extension of the resilient members 13 has urged the "B" mold plate 74 away from the spacer blocks 12 so as to create a pressing stroke (commonly but not restricted to approximately 0.060 to 0.350 inch). The retention mechanism 37 extends to accommodate this process. The die inserts 5b which are affixed to the pillars 15 are held back in a fully retracted and stationary position by hydraulic cylinders (not shown) or the like. As a result, the distance between the die inserts 5b and the parting line has been increased by a distance equal to the pressing stroke. The net result is an increased volume of the mold cavities 7b housed in the "B" half of the mold. It should be noted that the toggle clamp members 91 have not changed position: it is only the resilient members 13 that have elongated. It should also be noted that the extension of plate 74 is ultimately restricted by shoulder bolts 21.

Figure 4:
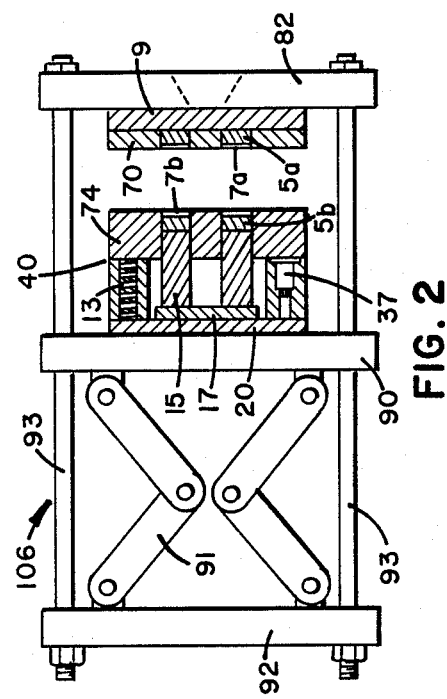

Once the resilient members 13 have extended to establish a pressing stroke (as shown in FIG. 3), the control system 88 activates valve 81b to cause hydraulic cylinder 80b to elongate, thereby "straightening" associated pairs of toggle clamp members 91 and causing the movable mold platen 90 to approach the stationary mold platen 82, as shown in FIG. 4. This results in a fully closed parting line and seals the enlarged molding cavities 7 formed in part by die inserts 5a and 5b. At this point, the "B" mold plate 74 is held against "A" mold plate 70 with force sufficient to seal the parting line to prevent flash therein. A sealing force of approximately 100,000 pounds has been found sufficient for the four cavity lens mold example, but other sealing forces could be used depending on the particular thermoplastic chosen to mold the parts, its melt temperature, viscosity and surface tension, and the projected cross-sectional area of the runner system, among other factors. The resilient members 13 provide this sealing force. If resilient members 13 are simply springs, their compression when the mold plates 74 and 70 abutt generate the sealing force; to obtain greater force, a greater deflection is needed. By contrast, if the sealing members 13 are hydraulic cylinders, as in the preferred embodiment, the sealing force can be controlled independent of the degree of compression of the hydraulic cylinders. In the preferred embodiment, control system 88 controls the extension and contraction of the resilient members 13 to dictate the sealing pressure generated thereby.

In one embodiment, the pressure exerted on the resilient members 13 by virtue of the action of "A" mold plate 70 on "B" mold plate 74 causes hydraulic fluid within the cylinders 13 to flow out of the cylinders and into an accumulator which includes a resilient member (a metallic or air spring, for example), so that, in effect, the hydraulic cylinders function in a manner similar to simple springs.

The slight compression of the resilient members 13 in FIG. 4 is illustrated by a decrease in the original "prefill advancement gap" 40.

Figure 5:
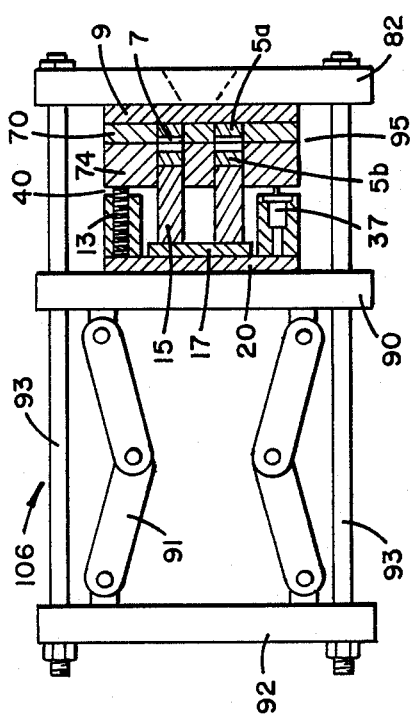

FIG. 5 illustrates the next step in the process. Once a sufficient sealing pressure is developed at the parting line, control system 88 activates valve 81a of plasticizing and injecting unit 101 to cause it to inject melt into the enlarged cavities 7 formed by the die inserts 5a and 5b. The measured volume of melt delivered (commonly referred to as the "shot size") to the runner 3 and cavities 7 is preferably determined by the control system 88 in combination with the injecting unit 101. The onset of movable platen compressive clamping force stroke can be alternatively controlled by time; by the position of the reciprocating-injecting screw of unit 101; or by a pressure sensor mounted in the mold, for example. 0f these, clamping triggering control on the basis of time is probably the least precise. Control based on time is also of an "open loop" nature. Cavity pressure triggering of clamping compression also requires that the injected melt volume exceed the enlarged cavity volume. This results in a pressurization of the molten polymer up to the preset cavity pressure level. This last phase of cavity fill against increasing pressures, however, produces undesirable molded-in stresses in the molded optical plastic part.

Thus, the preferred setup is to trigger onset of clamping-compression by screw position: advancement of the reciprocating screw is halted when full delivery of the shot has been completed. Transducer 67a shown in FIG. 1 precisely monitors the screw position.

Through the precise control of the injection unit 101 by control system 88 and the adjustment of flow restrictive members 4 (if necessary), a premeasured amount of molten polymer is distributed to each cavity, against virtually no impedance or back pressure once the melt reaches the cavity, yet in a precise and interactively controlled manner.

Reference is now made to FIG. 6. Once the injection unit 101 has delivered the precisely predetermined volume of melt which corresponds to that screw position on transducer 67a which triggers the start of clamping compression, the control system 88 causes cylinder 80b (in the preferred embodiment) to elongate, thereby advancing movable mold platen 90 towards stationary mold platen 82. The force exerted on movable mold platen 90 is transmitted through movable clamping plate 20, ejector plate 17 and pillars 15 to the dies 5b. Thus, the full clamping force produced by the hydraulic toggle clamp is delivered compressively to the enlarged cavities 7.

Preferably, the position and velocity of movable platen 90 are controlled or profiled in such a way as to create a two-stage compression of the melt. During the first stage, the die inserts 5b and 5a are driven toward one another fairly quickly so as to, first, vent the gases within the molding cavities through gap 26, and, second, to compressively redistribute the still hot melt isotropically. Referring to FIG. 1, the controller 88 accomplishes this by controlling "active" manifold 54 so that low pressure, high volume hydraulic fluid is delivered to ratioing valve 81b ... Following this initial stage, a slower compression of the melt in the mold cavities takes place. During this second stage the polymer cools and solidifies under continuing compressive pressure, so as to cause the molded parts to continue to conform to the die inserts 5a and 5b to correct for thermally-induced shrinkages. The plate assembly 106 remains in this state until the melt drops below the plastic's glass transition temperature. Once this point is reached, the mold can be opened. The initial stage of venting and relatively fast melt redistribution preferably lasts only approximately 1/20 to 1/5 as long as the second stage (and subsequent), which in turn is continued throughout the remainder of the mold-closed cycle until just before mold-open and part ejection. Of course, the rate of curing depends on the rate at which heat is withdrawn from the melt. The controller 88 can cause coolant to course through channels 8 to speed this process.

FIG. 7 illustrates the next step of the molding process. Once a sufficient time has passed for the glass transition temperature of the plastic to be reached, controller 88 activates cylinder 80b to withdraw movable mold platen 90 from stationary mold platen 82. This causes the parting line to fully open to facilitate removal of the molded part(s). Note that at this point the ejector assembly has not been activated.

FIG. 8 shows the plate assembly 106 in its part ejection state. Resilient members 13 are held in their retracted positions. Ejector plate 17 of ejector assembly 104 is extended relative to the "B" mold plate 74 through the use of hydraulic cylinder 80c to eject the molded parts.

The preceeding disclosed the more preferred approach to creating and using variable-volume cavities. Alternatively, the rigidly connected assembly consisting of ejector plate 17, pillars 15 and die inserts 5b can be left "floating" relative to mold plate 74 so that the volume of mold cavity 7 increases as the melt is injected therein. The mold plate 74 is extended to the desired strokelength, as before, but in this embodiment the ejector plate 17 is untied (otherwise normally coupled by bolt through hole 28) and free of the backward stroke of the machine's hydraulic ejector assembly. The previous ejection cycle leaves inserts 5b in a relatively forward position (established by return pin 14) when the ejector returns, due to the minimal frictional forces betrween die 5b, pillars 15 and mold part 74. Now, when injected melt enters the cavity, melt pressure rapidly increases until it overcomes these frictional forces and the melt drives the dies 5b rearward until the enlarged cavities now holds just enough melt to exert pressure just equal to the aforementioned sliding frictional drag. The rest of the cycle is identical to that described previously.

SPECIAL ENHANCEMENTS FOR OPTICAL MOLDING

Since the present invention is especially ell-suited for optical lens and disk molding and most advantageous in multi-cavity production of same, further description of preferred embodiments is presented below.

1. Cavity-Imbalance Compensating Mold Design Features a. Adjustable Foow Restrictive Members

In the preceeding section discussing Rx lens mold design, the practical problem of simultaneously molding dissimilarly powered lenses of differing mass and volumes in a multi-cavity mold was pointed out. Means for compensation thereof are disclosed which use mechanical restrictions to vary the meltflow impedances in inverse order to individual cavity volume. A simple example of such would be to use lift-out interchangeable gate sections at the flow entry point or gate of each cavity. Such means would have the disadvantage of requiring a great number of such machined interchangable gate inserts in inventory, since a given configuration gives optimal results for only one combination of such differing Rx lenses.

Therefore, most preferred means for thus correctively redistributing meltflows to the differing lens cavities are as pictured in FIGS. 9A, 10A and 13, the adjustable flow restrictive members 4a and 4b and associated assembly pictured in FIG. 13.

Prior art injection-compression methods employ slow injection fill rates and delayed compression, so use of such adjustable flow-restrictive members would be relatively ineffective in controllably compensating for the dissimilar cavity-fill characteristics.

b. Pressure Regulation Ports and Excess Polymer Collection Wells

A preferred method not only employs flow restrictors 4 but additionally employs a pre-established initial cavity volume greater than the injected melt volume along with a slightly oversized shot size, as discussed above. However, this combination makes a slight remaining imbalance between differing lens cavities result either in an underfilled lens (which would be optically rejected) or a small flash at the mold parting line of the overfilled cavity. To prevent such problems and thus make such multi-cavity molding of dissimilar Rx lenses practical, the following means are additionally disclosed.

In a 4-cavity grouping of four different powers that is being run for the first time, each cavity's adjustable flow restrictive member 4 must be set (using the adjustment components shown in FIG. 13 and described above), using several iterations, to properly distribute the incoming melt among the dissimilar-volume cavities.

Upon starting the setup, the first iteration may show an overfill in one cavity, proper fill in two, and underfill in the last. Bringing forward the flow restrictive member 4 of the overfilled cavity and backing off on that of the underfilled cavity in the next iteration should improve the balance. However, each adjustment iteration and change in shot size can create risk of flashing the mold at the parting line.

Therefore, each such melt-distributive flowpath of the lens mold can be furnished with a pressure relief port 31 and excess polymer collection well 32. Note the Rx lens mold detail drawings FIGS. 9B and 10B, showing shallow pressure relief ports 31 in communication with deeper excess polymer collection wells 32 at the parting line. The pressure relief port 31 and well 32 are preferably of equal dimensions; a narrow channel of typically 0.250–0.50 inch length and width and 0.005–0.020 inch depth is cut into the parting line leading out of the flowpath as shown.

Because in the prefrred embodiment for Rx lensmolding minimal injection pressures are used to fill the cavities and maximum melt pressures are attained only during the rapid-compression stroke (see FIG. 5 of process sequences) and its resulting redistribution of the still hot melt throughout the cavity, the combined pressure relief port 31 and excess polymer collection well 32 function mainly during this step of the process. As each cavity is thus pressurized, if slight excess plastic material exists therein, a corresponding backpressure is exerted back through its flowpath. Rather than risk flashing the parting line, therefore, the pressure relief port 31 and excess polymer collection well 32 serve as a built-in relief for such excess melt. As soon as this first stroke forces any excess material into the narrow pressure relief port channel, cooling and solidification of its thin section quickly occur, so that complete freeze-off has taken place before the final slow-moving stroke starts, during which thermal shrinkage occurs and after which ultimate lens thickness is attained.

Location of the presure relief port could theoretically be anywhere on the melt flowpath in fluid communication between the injection nozzle and the lens cavity, since the melt pressure is exerted omnidirectionally. A typical such location for two pressure relief ports 31 and corresponding collection wells 32 in a four cavity lens mold design is shown in FIG. 9A.

With reference to the Weber patents cited above, it should be noted that the pressure relief ports 31 are not functioning as transfer pockets to accept from the cavities large amounts of plastic during compression, in an attempt to reduce knitlines which can be associated with high-minus-power lens. By design, the pressure relief ports 31 are unsuited to do this both by their size and location.

The dimensions of pressure relief ports 31 make them unsuitable receptacles for the large displaced volumes of plastic needed to remedy knitlines. Also, the pressure relief ports 31 can be located anywhere in fluid communication with the melt flow path whereas the Weber transfer pockets are located so as to receive the lens' knitlines.

2. Venting the Mold Cavities

The present invention desires to fill mold cavities as fast as possible consistent with minimum pressures. Therefore, once the melt enters the cavity, poor venting—which fails to allow escape paths for air, heated gases and volatile fractions out of the hot, molten plastic—creates an undesirable backpressure opposing the incoming melt. This is a particular problem to high-aspect-ratio, long-fill molds for disks and the like, though also a problem for Rx lenses. Special provision is disclosed to quickly evacuate such gases, by allowing for a certain air gap around the entire circumference of the moving half of the stamper, which is precisely dimensioned to allow for gases to readily escape but insufficient to allow any molten to enter. This gap, designated with reference numeral 26 in FIGS. 12B, 9B and 10, is preferably 0.0005–0.0015 inch at its narrowest point, which would preferably be as it opens into the mold cavity, and generally is increased after ⅛ to ¼ inch further down to a plurality of grooves 27 first circumferentially then running axially down the remaining length of the movable half die 5b to join the die support pillars 15 at a similar champfered circumferential groove. Mating with these champfers on the bases of die 5 are similarly dimensioned and distributed axial grooves. Mating with these champfers on the bases of die 5 are similarly dimensioned and distributed axial grooves running the length of pillars 15. A typical venting cut can include 4 grooves (each at 90 degrees) of 0.060 inch deep and ¼ inch wide. Thus are created multiple paths for escaping gases leaving the mold cavity to, first, flow through the circumferential air gap 26, next down the grooves 27, then past the pillars 15 and into the ejector box, whence they escape to the atmosphere.

By contrast, conventional venting designs first create a shallow land circumferentially around the cavity and cut into one or both A and B mold plates, such that the land thus created by such cuts consists of a total venting gap of 0.0005–0.0025 inches at the parting line. From this land runs deeper venting trails which exhaust gases out of the parting line only and at the outside edges of the A and B mold plats. Such design thus offers only about one half the available total venting gap cross-sectional area of the present invention. It should be noted that preferred embodiment can also employ conventional venting whereby gases are vented radially out of thin slits between the mold plates. These thin slits permit the flow of gases while preventing the escape of molten plastic. While the present invention provides rapid venting of the cavities, it should be noted that the cavities are indeed "closed" in the sense that plastic cannot escape therefrom except back through the gates during compression of the plastic within the cavities.

3. In Situ Coring-Hole Formation Apparatus for Disks

Immediately after injection and while the cavities' molten plastic is very hot and mobile, the first stage of clamp-actuated profiled compression starts. As the movable half of the mold advances in FIG. 15, a core forming male member 43b' converges through the fluid melt towards a core-forming female member 43a', and seals off against a flat land thereto.

To the extent that these paired in-the-cavity coring members 43' may somewhat impede filling, it is believed that they still have less of a detrimental effect on disk quality than the prior art alternatives which "coldform" the plastic by shearing forces. Reference is made to U.S. Pat. Nos. 4,185,955 and 4,260,360, issued to J. R. Holmes.

4. Quick Mold-Element Changeover

Interchangeable optical part forming surface elements which critically determine the subsequent performance characteristics of the optical part are the stamper, which imparts the precise pattern of pits and grooves which carry the encoded information in optical disks, and the lens die insert, which imparts the highly polished and precisely curved contour to controllably bend light in optical lenses. To change product type, one must change these mold elements. Minimal production disruptions occur if such quick changeover can be made "in the press" by latchable subassemblies which are removable and accessable thereto when the mold is in its mold-open position. A variety of such designs are well known.

5. Optional Rx Lens Coating Drip Tab

Inherent to thermoplastic molded Rx spectacle lenses is a need for a hard, scratch-resisting surface coating. Such liquid coatings are most economically applied in high volume, automated dip coating processes. However, these coatings tend to accumulate at the lens' bottom half or downstream side, and thus produce an optically abberating buildup. Therefore, a common practice is to mold onto the lens a small, thin tab at that most downstream location (relative to the lens' orientation as held by the coating fixture). This optional tab "wicks" the excess liquid coating away by gravity from the otherwise lowest portion on the lens. Such an optional drip tab is pictured (99) in FIG. 9B.

6. Optional Hot Runner or Insulated Runner Systems

Conventional cold runner designs in multi-cavity thermoplastic molds are increasingly being superceded in either insulated or, more commonly, heated runner system designs. This is especially true when long production run length is likely and reuse of plastic material required is not possible; both these conditions are met for optical lens and disk production. Further advantages are the shorter cycle time and shorter melt flowpaths of such runnerless system designs for optical thermoplastic multi-cavity molding.

FIGS. 17 and 18 show a hot runner multi-cavity mold design according to the invention. The hot runner manifold assembly 115 shown in dotted area of FIG. 17 is heated most preferably electrically (by manifold heater 119 and nozzle heater 126) but optionally also be other means, including by circulating heat transfer fluids or by heat pipes. Heat input thus is spread conductively throughout the manifold assembly 115 to always keep fluid the thermoplastic contents of material passage channel 127, which is in fluid connection with the injection molding machine nozzle (not shown) and the individual cavities' sprue-forming channel 1. Since the mold plate 70 and die inserts 5a are maintained at temperatures below the thermoplastic's solidification point, the material freezeoff first occurs at the most restrictive point at the juncture of the manifold's material passage channel 127 and sprue-forming channel 1.

In operation, during injection fill, new plasticized melt is supplied thru passages channel 127, displacing its contents from the previous cycle thru sprue forming channel 1 into the disk cavities formed by die inserts 5a and 5b. When injection fill stops and rapid compression commences, core-forming members 43a and 43b converge and form a seal, separating newly-formed coreless disk 31 (still molten) from core sprue 30 (still molten). Volatiles and air are expelled from the cavities during fill and compression steps through circumferential vent passage 26 and leaves the mold through stationary platen moldhalf relief hole 128 and through core moldhalf relief passages 27 leading into the open ejector box. Cooling continues, with first freezeoff occurring at the intentionally restrictive gate (juncture of 127 and 1), thus sealing off manifold passage channel 127 until the next injection fill cycle commences. Remaining steps of continuing shrinkage compensation compresion, solidification and ejection are as described previuusly, as is moldclosing and cavity forming steps leading to being ready for next cycle injection fill.

Functional Equivalents

To illustrate the breadth of the invention, two aspects of same are discussed below in terms of equivalent structures and methods. Of course, this discussion is not exhaustive, and other components and assemblies of the disclosed embodiments could be replaced by functional equivalents.

1. Use of Molding Machine—Supplied Core Pull Motions to Actuate Plate Separation/Cavity Enlargement Most injection molding machine manufacturers offer a "corepull" optional equipment package as either OEM-factory-installed or field-installed retrofit. Such core pull hydraulics systems ordinarily function, when rigidly connected with movable core elements in a mold, to thrust forward or backward, upon demand of the machine's control system. In this manner, a mold's coring element may be withdrawn as part of an ejection sequence to aid molded article part removal, then returned to a forward position during the next cycle before melt injection and filling commences.

Those skilled in the art will recognize the equivalence of these machine-controlled motions to the energizing and control assembly and circuit 104 (including 79, 78, 77), which combine to assist and support the plate separating and plate retaining functions of controlled resilient members 13 and 37, respectively.

2. Use of Molding Machine Supplied Hydraulic Ejection Systems' Precision Settable Position and Forward Stroke of Same, to Provide Compressive Strokelength All modern injection molding machines come with a hydraulic cylinder actuated ejection system, which is thrust forward and returned backward under control of machine control system. Recent improvements in same have provided similar accuracies and program mobility to such motions and positions under CNC control, including pulsed (multi-stage) ejection.

Those skilled in the art will recongize the equivalence of these machine controlled motions to provide one or more stages of programmable compressive stroke; instead of tieing all movable die 5b elements together in fixed relationships by means of a common plate thereto and then driving it forward controllably by means of movable platen clamping motions' forward travel, one merely ties the common plate in fixed relationship in turn to the ejector assembly, so motions thereof are translated into like motions of each of the dies 5b (Clamp induced compression, however, is still preferred over ejector induced compression due to greater force available (a particular factor in highly powered and very thin Rx lenses) and due to toggle clamp's superior accuracy (due to mechanical leverage advantage)). An important aspect of the multi-cavity portion of the invention is that the movable die inserts are "commonly" and simultaneously driven by, for example, the movable platen or by the ejector plate. The mold cavities are thereby readily simultaneously acted upon, and there is no need to attempt to simultaneously control a plurality of hydraulic cylinders.

Such ejector system induced compression could be substituted for clamp induced compression in combination with either of the two ways disclosed for cavity formation and fill.

3. Use of CNC-Controlled "All-Electric" Injection Molding Machine (In Place of Hydraulic or Mechanical-Hydraulic Clamp and Ejector-Equipped Machines Very recently introduced in smaller machine sizes (less than 100 ton clamps), are machines employing energy-saving electrical servodrives for clamp mechanism, injection, screw rotation and ejector stroke. Such machines obviously therefore lend themselves most readily to digital control via CNC, and indeed such CNC control systems are "standard" on all such machines by one leading supplier, Cincinnati Milicron.

Such "all electric" machines functional equivalence to the detailed CNC-controlled hydraulic-based mechanism and control system disclosed herein is obvious and contemplated by the present invention.

It should be emphasized that the present invention is not limited to any particular components, materials or configurations and modifications of the invention will be apparent to those skilled in the art in light of the foregoing description. This description is intended to provide specific examples of individual embodiments which clearly disclose the present invention. Accordingly, the invention is not limited to these embodiments or to the use of elements having the specific configurations and shapes as presented herein. All alternative modifications and variations of the present invention which fall within the spirit and broad scope of the appended claims are included.

We claim:

1. A method of forming an article from a molten plasticized thermoplastic resin using an injection molding machine capable of producing a main clamp force, comprising the steps of:

(a) forming a mold cavity by adjusting relative positions of an opposing pair of inserts upon which the molded plastic article will be formed, at least one insert being capable of movement relative to the other insert within settable mechanical limits, wherein the dimensions of said mold cavity are determined by the combination of the distance between the machine's movable platen and its fixed platen and said settable mechanical limits, and said inserts are initially separated within the mold cavity to form a pre-enlarged cavity volume greater than a maximum volume occupied at atmospheric pressure by the molten plastic resin to be injected into the cavity, thereby being suitable for receiving the plastic resin without introducing significant back pressure therein since at least some gas volume is provided for in addition to the volume to be occupied by the plastic molten resin;

(b) injecting into the mold cavity a volume of the plasticized resin slightly larger than the volume of the article to be formed but insufficient to fill said pre-enlarged mold cavity, said injected resin volume being of at least equal mass as the final molded article at desired dimensions;

(c) applying the main clamp force of the injection molding machine before completion of said injection, so as to reduce the volume of the mold cavity, thereby filling said reduced-volume mold cavity and driving out gases through vent means; and (d) maintaining the applied main clamp force until a final clamp lock-up position is reached, thereby compressing the resin until any slight excess resin is forced into pressure relief means and the resin within the further reduced-volume mold cavity solidifies, such that final molded article's desired dimensions are determined by said settable mechanical limits.

2. The method of forming an article from a molten thermoplastic resin of claim 1, wherein the injection molding maching has first and second mold platens, first and second parting line mold plates, a first mold insert operatively disposed within the first parting line mold plate, and a second mold insert operatively disposed within the second parting line mold plate, wherein the first and second mold plates and first and second mold inserts are respectively commonly supported by the first and second mold platens, and are respectively separated by a first distance and a second distance.

3. The method according to claim 2, wherein the step of forming the closed mold cavity comprises reducing the distance between the first and second parting line mold plates while maintaining the distance between the first and second mold inserts.

4. The method according to claim 2, wherein the main clamp force applying step comprises forcing the second mold insert to slide within the second mold plate toward the first mold insert.

5. The method according to claim 4, wherein applying the main clamp force comprises controlling the position and velocity of the second mold insert relative to the first mold insert.

6. The method according to claim 5, wherein the movable second mold insert is controlled to have an initial fast stroke to primarily eliminate any gas in the closed mold cavity followed by a slower stroke to compress the resin to compensate for cooling-induced shrinkage thereof.

7. The method according to claim 2, further comprising the step of relieving the pressure of the plasticized resin when it becomes excessive.

8. The method according to claim 1, wherein the article formed is a lens.

9. The method according to claim 1, wherein the article formed is a disk.

10. A method of forming a plurality of articles from a molten plasticized thermoplastic resin using an injection molding machine having first and second mold platens, first and second parting line mold plates, a plurality of first mold inserts operatively disposed within the first parting line mold plate, and a plurality of second mold inserts operatively disposed within the second parting line mold plate, wherein the first and second mold plates and first and second mold inserts are respectively commonly supported by the first and second mold platens, the method comprising:

(a) forming a plurality of mold cavities by adjusting relative positions of opposing pairs of inserts upon which the molded plastic article will be formed, at least one insert being capable of movement relative to the other insert within settable mechanical limits, wherein the dimensions of said mold cavities are determined by the combination of the distance between the machine's movable platen and its fixed platen and said settable mechanical limits, and said inserts are initially separated within the mold cavities to form pre-enlarged cavity volumes greater than a maximum volume occupied at atmospheric pressure by the molten plastic resin to be injected into the cavities, thereby being suitable for receiving the plasticized resin without introducing significant back pressure therein since at least some gas volume is provided for in addition to the volume to be occupied by the plastic molten resin;

(b) injecting into each mold cavity a a volume of the plasticized resin slightly larger than the volume of the article to be formed but insufficient to fill said pre-enlarged mold cavities, said injected resin volume bing of at least equal mass as the final molded article at desired dimensions;

(c) commonly and simultaneously applying the main clamp force of the injection molding machine before completion of said injection, so as to reduce the volumes of the mold cavities, thereby filling said reduced-volume mold cavities and driving out gases through vent means; and maintaining the applied main clamp force until a final clamp lock-up position is reached, thereby compressing the resin until any slight excess resin is forced into pressure relief means and the resin within the further reduce-volume mold cavities solidifies, such that final molded article's desired dimensions are determined by said settable mechanical limits.

11. The method according to claim 10, wherein the step of forming the closed mold cavities comprises reducing the distance between the first and second parting line mold plates while maintaining the distance between associated pairs of the first and second mold inserts.

12. The method according to claim 10, wherein the mass of plasticized resin injected into each closed mold cavity is more than approximately 100% and less than approximately 105% of the mass of the article to be formed therein.

13. The method according to claim 10, wherein the mass of plasticized resin injected into each closed mold cavity is more than approximately 100% and less than approximately 101% of the mass of the article to be formed therein.

14. The method according to claim 10, wherein the resin is polycarbonate.

15. The method according to claim 10, wherein the first mold plate and the first mold inserts are stationary and the second mold plate and the second mold inserts are movable; wherein the second mold inserts are slideable relative to the second mold plate; and wherein the mold cavities forming step comprises extending the second mold plate relative to the second mold platen while holding the second mold inserts motionless relative to the second mold platen.

16. The method according to claim 15, wherein the force applying step comprises forcing the second mold inserts to slide within the second mold plate toward the associated first mold inserts.

17. The method according to claim 16, wherein applying the force comprises commonly and simultaneously controlling the position and velocity of the second mold inserts relative to the first mold inserts using the main clamp of a CNC machine.

18. The method according to claim 17, wherein the movable second mold inserts are controlled to have an initial fast stroke to primarily eliminate any gas in the closed mold cavities followed by a slower stroke to compress the resin to compensate for cooling-induced shrinkage thereof.

19. The method according to claim 10, wherein the injecting step comprises injecting the plasticized resin using a reciprocating screw.

20. The method according to claim 10, further comprising the step of relieving the pressure of the plasticized resin when it becomes excessive.

21. The method according to claim 20, wherein the pressure is relieved in the event an excess of plasticized resin is injected into one or more of the closed mold cavities.

22. The method according to claim 21, wherein the injecting step comprises injecting the plasticized resin through a plurality of gates into the closed mold cavities, and wherein excessive pressure of the plasticized resin within each mold cavity is relieved by permitting some of the resin to flow from the associated gate into a pressure relief region in fluid communication with the associated gate.

23. The method according to claim 10, further comprising individually controlling the flow of plasticized resin to each mold cavity to balance the mold.

24. The method according to claim 23, wherein the injection molding machine comprises a plurality of gates in association with the plurality of mold cavities, and wherein the flow of plasticized resin to each cavity is controlled by an adjustable flow resistance member which can block the associated gate to varying degrees to control the flow of plasticized resin therethrough.

25. The method according to claim 10, wherein the injecting step comprises venting gases from the closed mold cavities around the outer peripheries of the mold inserts as the closed mold cavities are being filled with plasticized resin.

26. The method according to claim 10, further comprising the step of plasticizing the thermoplastic resin prior to injecting the resin into the closed mold cavities.

27. The method according to claim 10, wherein the articles formed are lenses.

28. The method according to claim 27, wherein the lenses are dissimilar.

29. The method according to claim 10, wherein the articles formed are disks.

30. The method according to claim 29, wherein the mold cavities forming step comprises forming cores for the disks, whereby coring the disks following solidification can be avoided.

31. The method according to claim 10, wherein the injecting step comprises injecting into each closed mold cavity a mass of the plasticized resin slightly greater than the mass of the article to be formed therein.

* * * * *

UNITED STATES PATENT AND TRADEMARK OFFICE
CERTIFICATE OF CORRECTION

PATENT NO. : 4,828,769

DATED : May 9, 1989

INVENTOR(S) : Steven M. Maus, George J. Galic

It is certified that error appears in the above-identified patent and that said Letters Patent is hereby corrected as shown below:

In column 1, line 33, please delete "resistant".

In column 1, line 52, please delete "b" and insert therefore --by--.

In column 3, line 62, please delete "opaqu" and insert therefore --opaque--.

In column 5, lines 65-66, please delete "approxiamtely" and insert therefore --approximately--.

In column 6, lines 31, please delete "steper" and insert therefore --steeper--.

In column 12, line 4, please delete "len.." and insert therefore --lens.--.

In column 12, lines 18-19, please delete "stamper. mechanical" and insert therefore --stamper.
 c.  In-mold shutoff valving may be needed to permit mechanical--

In column 12, line 60, please delete "th" and insert therefore --the--.

In column 14, line 19, please delete "stra.ins" and insert therefore --strains--.

In column 15, line 29, please delete "essential they" and insert therefore --essential - they--.

UNITED STATES PATENT AND TRADEMARK OFFICE
CERTIFICATE OF CORRECTION

PATENT NO. : 4,828,769

DATED : May 9, 1989

INVENTOR(S) : Steven M. Maus, George J. Galic

It is certified that error appears in the above-identified patent and that said Letters Patent is hereby corrected as shown below:

In column 16, line 7, please delete "ambodiment" and insert therefore --embodiment--.

In column 16, line 34, please delete ejectorassembly" and insert therefore --ejector assembly--.

In column 17, line 58, please delete "Transucer" and insert therefore --Transducer--.

In column 20, line 30, please delete "company" and insert therefore --Company--.

In column 22, line 18, please delete "on" and insert therefore --an--.

In column 24, line 11, please delete "ff" and insert therefore --of--.

In column 24, line 40, please delete "parts a" and insert therefore --parts of a--.

In column 25, line 14, please delete "deliverately" and insert therefore --deliberately--.

In column 26, line 38, please delete "through" and insert therefore --though--.

In column 27, line 27, please delete "abutt" and insert therefore --abut--.

UNITED STATES PATENT AND TRADEMARK OFFICE
CERTIFICATE OF CORRECTION

PATENT NO. : 4,828,769

DATED : May 9, 1989

INVENTOR(S) : Steven M. Maus, George J. Galic

It is certified that error appears in the above-identified patent and that said Letters Patent is hereby corrected as shown below:

In column 28, line 38, please delete "8lb ... Following" and insert therefore --8lb.  Following--.

In column 29, line 3, please delete "preceeding" and insert therefore --preceding--.

In column 29, line 16, please delete "betrween" and insert therefore --between--.

In column 29, line 20, please delete "cavities" and insert therefore --cavity--.

In column 29, line 27, please delete "ell-suited" and insert therefore --well-suited--.

In column 29, line 34, please delete "Foow" and insert therefore --Flow--.

In column 29, lines 45-46, please delete "interchangable" and insert therefore --interchangeable--.

In column 29, line 67, please delete "result" and insert therefore --resulting--.

In column 30, line 52, please delete "presure" and insert therefore --pressure--.

UNITED STATES PATENT AND TRADEMARK OFFICE
CERTIFICATE OF CORRECTION

PATENT NO. : 4,828,769

DATED : May 9, 1989

INVENTOR(S) : Steven M. Maus, George J. Galic

It is certified that error appears in the above-identified patent and that said Letters Patent is hereby corrected as shown below:

In column 31, lines 31-33, please delete "Mating with these champfers on the bases of die 5 are similarly dimensioned and distributed axial grooves.".

In column 31, line 50, please delete "plats" and insert therefore --plates--.

In column 32, line 58, please delete "be" and insert therefore "by".

In column 33, line 20, please delete "compresion" and insert therefore --compression--.

In column 33, line 21, please delete "previuusly" and insert therefore --previously--.

In column 33, line 65, please delete "recongize" and insert therefore --recognize--.

In column 34, line 11, please delete "advantage))." and insert therefore --advantage.)--.

In column 35, line 4, please delete "plastic" and insert therefore --plasticized--.

UNITED STATES PATENT AND TRADEMARK OFFICE
CERTIFICATE OF CORRECTION

PATENT NO. : 4,828,769

DATED : May 9, 1989

INVENTOR(S) : Steven M. Maus, George J. Galic

It is certified that error appears in the above-identified patent and that said Letters Patent is hereby corrected as shown below:

In column 36, line 25, please delete "a a" and insert therefore --a--.

Signed and Sealed this

Fourteenth Day of May, 1991

*Attest:*

*Attesting Officer*

HARRY F. MANBECK, JR.

*Commissioner of Patents and Trademarks*